United States Patent
Benedyk et al.

(10) Patent No.: US 6,990,089 B2
(45) Date of Patent: Jan. 24, 2006

(54) METHODS AND SYSTEMS FOR ROUTING MESSAGES IN A RADIO ACCESS NETWORK

(75) Inventors: Robby Darren Benedyk, Raleigh, NC (US); Cory Andrew Grant, Apex, NC (US); Peter Joseph Marsico, Carrboro, NC (US); John R. Mason, Clayton, NC (US)

(73) Assignee: Telelec, Calabasas, CA (US)

( * ) Notice: Subject to any disclaimer, the term of this patent is extended or adjusted under 35 U.S.C. 154(b) by 769 days.

(21) Appl. No.: 09/735,142

(22) Filed: Dec. 12, 2000

(65) Prior Publication Data

US 2002/0105969 A1 Aug. 8, 2002

(51) Int. Cl.
*H04Q 7/24* (2006.01)

(52) U.S. Cl. .................................. 370/338; 370/467
(58) Field of Classification Search ............ 370/310.1, 370/310.2, 338, 401, 466, 467, 395.1
See application file for complete search history.

(56) References Cited

U.S. PATENT DOCUMENTS

| | | | |
|---|---|---|---|
| 5,008,929 A | 4/1991 | Olsen et al. | |
| 5,142,622 A | 8/1992 | Owens | 395/200 |
| 5,208,811 A | 5/1993 | Kashio et al. | 370/94.1 |
| 5,239,542 A | 8/1993 | Breidenstein et al. | 370/79 |
| 5,315,641 A | 5/1994 | Montgomery et al. | 379/94 |

(Continued)

FOREIGN PATENT DOCUMENTS

| | | |
|---|---|---|
| EP | 0 853 411 A2 | 7/1998 |
| WO | WO 97/11563 A2 | 3/1997 |
| WO | WO 98/28885 A1 | 7/1998 |
| WO | WO 00/19758 A2 | 4/2000 |
| WO | WO 00/22840 A2 | 4/2000 |
| WO | WO 00/30369 A1 | 5/2000 |
| WO | WO 00/31933 A1 | 6/2000 |
| WO | WO 00/33519 A1 | 6/2000 |
| WO | WO 00/56032 A1 | 9/2000 |

OTHER PUBLICATIONS

O'Shea, "Mating Season," Telephony, p. 10–11, (Sep. 20, 1999).
Hamdi et al., "Voice Service Interworking for PSTN and IP Networks," IEEE Communications Magazine, p. 104–111, (May 1999).
Lakshmi–Ratan, "The Lucent Technologies Softswitch–Realizing the Promise of Convergence," Bell Labs Technical Journal, p. 174–195, (Apr.–Jun. 1999).
Tekelec, "Eagle® Feature Guide," Publication P/N 910–1225–01, Revision B, (Jan. 1998).
O'Shea, "The Network That's Never Done," Telephony, p. 38, 40, 42, 43, (Sep. 15, 1997).

(Continued)

*Primary Examiner*—Chau Nguyen
*Assistant Examiner*—Blanche Wong
(74) *Attorney, Agent, or Firm*—Jenkins, Wilson & Taylor, P.A.

(57) ABSTRACT

Methods and systems for routing messages between a core network and a radio network controller are provided. A radio access network gateway translates messages from an ATM-based protocol to a non-ATM-based protocol, such as the stream control transmission protocol and vice versa. The radio access network gateway forwards the SCTP messages to the core network. In addition, the radio access network gateway receives messages from the core network formatted according to the core network protocol and translates these messages to an ATM-based protocol for communication to a radio network controller.

66 Claims, 11 Drawing Sheets

U.S. PATENT DOCUMENTS

| | | | |
|---|---|---|---|
| 5,384,840 A | 1/1995 | Blatchford et al. | 379/229 |
| 5,420,916 A | 5/1995 | Sekiguchi | 379/230 |
| 5,430,727 A | 7/1995 | Callon | 370/85.13 |
| 5,509,010 A | 4/1996 | La Porta et al. | 370/68.1 |
| 5,568,487 A | 10/1996 | Sitbon et al. | 370/94.1 |
| 5,581,558 A | 12/1996 | Horney, II et al. | 370/401 |
| 5,583,927 A | 12/1996 | Ely et al. | 379/207 |
| 5,586,177 A | 12/1996 | Farris et al. | 379/230 |
| 5,638,431 A | 6/1997 | Everett et al. | 379/115 |
| 5,640,446 A | 6/1997 | Everett et al. | 379/115 |
| 5,651,002 A | 7/1997 | Van Seters et al. | 370/392 |
| 5,657,452 A | 8/1997 | Kralowetz et al. | 395/200.57 |
| 5,664,102 A | 9/1997 | Faynberg | 395/200.76 |
| 5,675,635 A | 10/1997 | Vos et al. | 379/113 |
| 5,680,552 A | 10/1997 | Netravali et al. | 395/200.2 |
| 5,696,809 A | 12/1997 | Voit | 379/5 |
| 5,701,301 A | 12/1997 | Weisser, Jr. | 370/428 |
| 5,706,286 A | 1/1998 | Reiman et al. | 370/401 |
| 5,712,903 A | 1/1998 | Bartholomew et al. | 379/89 |
| 5,732,213 A | 3/1998 | Gessel et al. | 395/200.11 |
| 5,740,374 A | 4/1998 | Raffali-Schreinemachers | 395/200.68 |
| 5,761,281 A | 6/1998 | Baum et al. | 379/93.29 |
| 5,761,500 A | 6/1998 | Gallant et al. | 395/610 |
| 5,764,750 A | 6/1998 | Chau et al. | 379/228 |
| 5,764,955 A | 6/1998 | Doolan | 395/500 |
| 5,768,361 A | 6/1998 | Cowgill | 379/229 |
| 5,768,525 A | 6/1998 | Kralowetz et al. | 395/200.58 |
| 5,774,695 A | 6/1998 | Autrey et al. | 395/500 |
| 5,781,534 A | 7/1998 | Perlman et al. | 370/248 |
| 5,787,255 A | 7/1998 | Parlan et al. | 395/200.63 |
| 5,793,771 A | 8/1998 | Darland et al. | 370/467 |
| 5,802,285 A | 9/1998 | Hirviniemi | 395/200.8 |
| 5,805,587 A | 9/1998 | Norris et al. | 370/352 |
| 5,812,781 A | 9/1998 | Fahlman et al. | 395/200.56 |
| 5,815,669 A | 9/1998 | Lee et al. | 395/200.68 |
| 5,828,844 A | 10/1998 | Civanlar et al. | 395/200.58 |
| 5,838,782 A | 11/1998 | Lindquist | 379/230 |
| 5,852,660 A | 12/1998 | Lindquist et al. | 379/230 |
| 5,867,495 A | 2/1999 | Elliott et al. | 370/352 |
| 5,870,565 A | 2/1999 | Glitho | 395/200.79 |
| 5,872,782 A | 2/1999 | Dendi | 370/385 |
| 5,878,129 A | 3/1999 | Figurski et al. | 379/230 |
| 5,889,954 A | 3/1999 | Gessel et al. | 395/200.53 |
| 5,892,822 A | 4/1999 | Gottlieb et al. | 379/220 |
| 5,912,887 A | 6/1999 | Sehgal | 370/354 |
| 5,917,900 A | 6/1999 | Allison et al. | 379/220 |
| 5,920,562 A | 7/1999 | Christie et al. | 370/395 |
| 5,923,659 A | 7/1999 | Curry et al. | 370/401 |
| 5,926,482 A | 7/1999 | Christie et al. | 370/469 |
| 5,940,598 A | 8/1999 | Strauss et al. | 395/200.79 |
| 5,949,871 A | 9/1999 | Kabay et al. | 379/229 |
| 5,958,016 A | 9/1999 | Chang et al. | 709/229 |
| 5,974,052 A | 10/1999 | Johnson et al. | 370/467 |
| 5,991,301 A | 11/1999 | Christie | 370/395 |
| 5,995,608 A | 11/1999 | Detampel, Jr. et al. | 379/205 |
| 6,006,098 A | 12/1999 | Rathnasabapathy et al. | 455/461 |
| 6,011,780 A | 1/2000 | Vaman et al. | 370/237 |
| 6,011,794 A | 1/2000 | Mordowitz et al. | 370/389 |
| 6,011,803 A | 1/2000 | Bicknell et al. | 370/467 |
| 6,014,379 A | 1/2000 | White et al. | 370/389 |
| 6,018,515 A | 1/2000 | Sorber | 370/229 |
| 6,021,126 A | 2/2000 | White et al. | 370/352 |
| 6,023,502 A | 2/2000 | Bouanaka et al. | 379/115 |
| 6,026,091 A | 2/2000 | Christie et al. | 370/395 |
| 6,047,005 A | 4/2000 | Sherman et al. | 370/522 |
| 6,064,653 A | 5/2000 | Farris | 370/237 |
| 6,067,546 A | 5/2000 | Lund | 707/10 |
| 6,069,890 A | 5/2000 | White et al. | 370/352 |
| 6,075,783 A | 6/2000 | Voit | 370/352 |
| 6,078,582 A | 6/2000 | Curry et al. | 370/356 |
| 6,079,036 A | 6/2000 | Moharram | 714/712 |
| 6,084,892 A | 7/2000 | Benash et al. | 370/701 |
| 6,084,956 A | 7/2000 | Turner et al. | 379/230 |
| 6,094,437 A | 7/2000 | Loehndorf, Jr. et al. | 370/420 |
| 6,097,719 A | 8/2000 | Benash et al. | 370/352 |
| 6,097,805 A | 8/2000 | Figurski et al. | 379/230 |
| 6,111,893 A | 8/2000 | Volftsun et al. | 370/466 |
| 6,112,090 A | 8/2000 | Valentine | 455/445 |
| 6,115,383 A | 9/2000 | Bell et al. | 370/400 |
| 6,118,779 A | 9/2000 | Madonna | 370/353 |
| 6,118,780 A | 9/2000 | Dunn et al. | 370/355 |
| 6,119,160 A | 9/2000 | Zhang et al. | 709/224 |
| 6,122,255 A | 9/2000 | Bartholomew et al. | 370/237 |
| 6,122,263 A | 9/2000 | Dahlin et al. | 370/329 |
| 6,122,365 A | 9/2000 | Yegoshin | 379/266 |
| 6,125,111 A | 9/2000 | Snow et al. | 370/360 |
| 6,125,177 A | 9/2000 | Whittaker | 379/243 |
| H1880 H | 10/2000 | Vines et al. | |
| H1896 H | 10/2000 | Hoffpauir et al. | |
| 6,128,379 A | 10/2000 | Smyk | 379/230 |
| 6,134,235 A | 10/2000 | Goldman et al. | 370/352 |
| 6,134,246 A | 10/2000 | Cai et al. | 370/474 |
| 6,137,869 A | 10/2000 | Voit et al. | 379/114 |
| 6,137,874 A | 10/2000 | Brown et al. | 379/220 |
| 6,144,667 A | 11/2000 | Doshi et al. | 370/401 |
| 6,144,670 A | 11/2000 | Sponaugle et al. | 370/401 |
| 6,151,390 A | 11/2000 | Volftsun et al. | 379/229 |
| 6,154,467 A | 11/2000 | Hager et al. | 370/467 |
| 6,157,710 A | 12/2000 | Figurski et al. | 379/230 |
| 6,178,181 B1 | 1/2001 | Glitho | |
| 6,195,425 B1 | 2/2001 | Farris | 379/230 |
| 6,201,804 B1 | 3/2001 | Kikinis | 370/352 |
| 6,215,783 B1 | 4/2001 | Neyman | 370/353 |
| 6,236,722 B1 | 5/2001 | Gilbert et al. | 379/230 |
| 6,278,697 B1 * | 8/2001 | Brody et al. | 370/310 |
| 6,324,183 B1 * | 11/2001 | Miller et al. | 370/467 |
| 6,349,099 B1 | 2/2002 | Larikka et al. | |
| 6,366,655 B1 | 4/2002 | Book et al. | 379/114.28 |
| 6,377,799 B1 * | 4/2002 | Hameleers et al. | 455/422.1 |
| 6,411,632 B2 | 6/2002 | Lindgren et al. | |
| 6,522,667 B1 | 2/2003 | Oda et al. | |
| 6,529,524 B1 * | 3/2003 | Liao et al. | 370/467 |
| 6,542,497 B1 | 4/2003 | Curry et al. | |
| 6,584,190 B1 | 6/2003 | Bressler | |
| 6,594,258 B1 | 7/2003 | Larson et al. | |
| 6,611,533 B1 | 8/2003 | Liao et al. | |
| 6,678,242 B1 | 1/2004 | Simon | |
| 6,680,953 B1 * | 1/2004 | Kim | 370/467 |
| 6,681,009 B1 * | 1/2004 | Graf et al. | 379/229 |
| 6,683,881 B1 * | 1/2004 | Mijares et al. | 370/401 |
| 2002/0048360 A1 | 4/2002 | Zambre et al. | |

OTHER PUBLICATIONS

Tekelec, "Eagle STP: Database Transport Access Feature," Publication 908–0136–01, (1997).

Tekelec, "SS7–Frame Relay Access Device: SS7 Protocol Information Translator," Publication 908–0167–01, (1997).

Tekelec, "Eagle STP: ANSI–ITU Gateway Feature," Publication 908–0133–01, (1997).

Tekelec, "Eagle STP: X.25 to SS7/IS.41 Protocol Conversion Feature," Publication 908–0135–01, (1997).

Tekelec, "STP–LAN Interface Feature," Publication 980–0134–01, (1997).

Tekelec, "Eagle STP: Platform," Publication 908–0126–01, (1997).

Snyder, "Rerouting Internet Traffic Jams," Telephony, p. 12, (Nov. 11, 1996).

Snyder, "Branded With Optics," Telephony, p. 49–50, (Jul. 22, 1996).

Anonymous, "Around the Loop," Telephony, p. 26, (Jul. 22, 1996).

Zaharychuk et al., "Gateway Signal Transfer Points: Design, Services and Benefits," IEEE, p. 0233–0240, (1990).

Bootman et al., "Generic Building Blocks for the Telecommunications Management Network," IEEE, p. 0163–0167, (1988).

Bootman et al., "Intelligent Network Services Using a Service Switching Node," IEEE, p. 1332–1335, (1988).

Buckles, "Very High Capacity Signaling Transfer Point for Intelligent Network Services," IEEE, p. 1308–1311, (1988).

Stewart et al., "Stream Control Transmission Protocol," Request for Comments: 2960, Network Working Group, p. 1–124, (Oct. 2000).

Sidebottom et al., "SS7 MTP3–User Adaptation Layer (M3UA)," Internet draft, draft–ietf–signtran–onn3a–04.txt IETF Network Working Group, p. 1–75, (Sep. 2000).

Loughney, J., "IP–Based Signaling Needs in Radio Access Networks," Internet draft, draft–loughney–sigtran–ip–ran–00.txt, IETF SIGTRAN Working Group, p. 1–14, (Jun. 16, 2000).

Sprague et al., "Transport Adapter Layer Interface," Internet draft, draft–benedyk–sigtran–tali–01.txt, IETF, p. 1–85, (Jun. 2000).

Loughney et al., "SS7 SCCP–User Adaptation Layer (SUA)," Internet draft, draft–loughney–sigtran–sua–00.txt, IETF Engineering Task Force, p. 1–46, (Mar. 8, 2000).

3RD Generation Partnership Project (3GPP), "Technical Specification Group Radio Access Network—UTRAN Overall Description," 3G TS 25.401 version 3.1.0, Release 1999, p. 1–34, (Dec. 17, 1999).

3RD Generation Partnership Project (3GPP), "Technical Specification Group Radio Access Network—UTRAN Iu Interface: General Aspects and Principles," 3G TS 25.410 version 3.1.0, Release 1999, p. 1–23, (Dec. 12, 1999).

ITU–T Recommendation Q.2630.1 (Sep. 29, 1999).

ITU–T Recommendation Q.2150.1 (Jun. 23, 1999).

Sidebottom et al., "SS7 MTP3–User Adaptation Layer (M3UA)," Internet Draft, Network Working Group, p. 1–79, (Nov. 2000).

Yrjö Raivio, "Transport Protocol Evolution in 3G Networks," World Telecommunications Congress/ISS2000, p. 1–11, (Aug. 5, 2000).

Subbiah et al., "Transport Architecture Evolution in UMTS/IMT–2000 Cellular Networks," International Journal of Communication Systems, p. 371–385, (May 11, 2000).

Ong et al., "Framework Architecture for Signaling Transport," Network Working Group, p. 1–24, (Oct. 1999).

Sprague et al., "Transport Adapter Layer Interface," Internet Draft, Internet Engineering Task Force, p. 1–30, (May 28, 1999).

Michael McGrew, "Transport SS7 Sginaling Over IP," Lucent Technologies Inc., p. 1–8, (Nov. 1998).

Communication under Rule 112 EPC in European Application No. 01 989 213.2—1525 (Nov. 17, 2004).

Pai, "In–Building Wireless: The Next Generation," TelephonyOnline.com, pp. 1–4 (Jun. 30, 2004).

Handa, "In Building Wireless: The Next Generation," TMCnet.com, pp. 1–7 (Feb. 12, 2004).

Fitchard, "A New Voice in the Boardroom," Wireless Review, pp. 1–3 (Sep. 1, 2003).

"Fixed Wireless Technology," ISP Planet, pp. 1–4 (May 14, 2002).

Martinek, "Office on the Fly," Wireless Review, pp. 1–4 (Jul. 15, 2001).

"March Networks 3300 Integrated Communications Platform," Mitel Networks Corporation, pp. 1–34 (Jul. 2001).

Swartz, "Ready, Set, Wireless Office!," Wireless Review, pp. 1–4 (Jun. 1, 2000).

"Telstra and Ericsson Trial Next Generation Wireless Office Solution," Ericsson, pp. 1–2 (Apr. 28, 2000).

"Mitel and Ericsson Join Forces to Deliver an Integrated Digital Wireless Office Solution with PBX Functionality-–Company Business and Marketing," Cambridge Telcom Report, pp. 1–4 (Apr. 24, 2000).

Sulkin, "Emerging Options for Wireless PBXs," Voice2000, pp. 1–8 (Feb. 2000).

Drzewianowksi, "WLANs—For the Picking," Communications Solutions™ Next–Gen Networks, pp. 1–9 (Jan. 2000).

"The Wireless Business Connection," Second Quarter 2000 Report, The Phillips Group—Infotech, pp. 1–9 (2000).

"Ericsson Announces General Availability of Its Mobile Advantage Wireless Office System," Ericsson Press Release, pp. 1–2 (Nov. 4, 1999).

"Corporate Offices to Go Wireless First Australian GSM on the Net Trial," Ericsson Press Release, pp. 1–3 (Aug. 11, 1999).

"Ericsson Solution Chosen for World's First Combined DECT/GSM Communications Service," Ericsson, pp. 1–9 (Jun. 21, 1999).

Johanson et al., "Mobile Advantage Wireless Office—A Digital Wireless Office System for TDMA/136 Networks," Ericsson Review No. 1, pp. 20–27 (1999).

"Enterprise IP Gateway," Ericsson, pp. 1–6 (1999).

"The Ericsson IPT System," Ericsson, pp. 1–8 (1999).

"Wireless: Top Ericsson Executives Lay Out Corporate Vision, Unveil Strategy for the Enterprise Customer—Company Business and Marketing," EDGE, On & About AT&T, pp. 1–5 (Nov. 30, 1998).

"Ericsson Wireless Office Services to Provide Digital System Through AT&T Wireless Services," Ericsson Press Release, pp. 1–2 (Apr. 17, 1998).

Woods, "Fresno Bee Still Buzzing About Wireless," TechNews, pp. 1–2 (1995).

"teleSys Announces the Compatibility of Ericsson's Mobile Advantage Wireless Office and teleSys' MACH7–IP Gateway," teleSys Software—Press Release, pp. 1–2 (Publication Date Unknown).

Copy of Affidavit of David M. Sprague filed in commonly–assigned, U.S. Appl. No. 09/443,712.

"Market and Development Agreement Targets Customers Looking for Ways to Become More Productive Through Convenient and Cost–Effective Communication," Ericsson Press Release, pp. (Apr. 4, 2000).

PCS Access Network Requirements: Interface Specification, Interface: Service Access Socket System Interface (SASSI), Version 01.01, Dec. 3, 1998.

PCS Acess Network Requirements: Product Specification, Network Element: Gateway Signal Transfer Point between CCS/SS7 and TCP–IP Networks (GW–STP–IP), Dec. 3, 1998.

Weekly Status Report for week of Jul. 13–Jul. 17, 1998.

Weekly Status Report for the Weeks of Jul. 6–Jul. Jul. 10, 1998.

Weekly Status Report for week of Jun. 15–Jun. 18, 1998.

Supplemental European Search Report in EP Patent Application No. 01989213 (Jan. 20, 2005).

"Digital Cellular Telecommunications System (Phase 2+) (GSM): Universal Mobile Telecommunications System (UMTS); Telecommunication Management Charging and Billing; 3G Call and Event Data for the Packet Switched (PS) Domain (3GPP TS 32.015 Version 3.3.0 Release 1999)," Global System for Mobile Communications, pp. 1–65 (Sep. 2000).

"GPRS: General Packet Radio Service," Usha Communications Technology, pp. 1–23 (Jun. 2000).

"Universal Mobile Telecommunications System (UMTS); UTRAN lu Interface: General Aspects and Principles (3G TS 25.410 version 3.1.0 Release 1999)," ETSI, pp. 1–2 (Jan. 2000).

* cited by examiner

METHODS AND SYSTEMS FOR ROUTING MESSAGES IN A RADIO ACCESS NETWORK

TECHNICAL FIELD

The present invention relates to methods and systems for routing messages in a radio access network. More particularly, the present invention relates to a gateway that routes and translates messages between a core network and a radio network controller that simplifies core network elements.

BACKGROUND ART

A radio access network (RAN) is a collection of network elements that enables calls to occur between mobile subscribers. Such a network includes nodes that carry voice traffic, signaling traffic, and a combination of voice traffic and signaling traffic. FIG. 1 illustrates a prior art radio access network used to provide wireless communication service to mobile subscribers. Such RAN network architectures include a number of functional components including transceiver stations 100, radio network controllers (RNCs) 102, and a core network 104. Core network 104 includes asynchronous transfer mode (ATM) network elements, such as ATM switches, that carry voice and signaling traffic relating to communications to and from mobile subscribers. As such, these switches are required to implement a variety of different communication protocol layers, including various ATM and SS7 protocol layers. Implementing multiple different protocol layers in the core network may be undesirable because it increases the complexity of core network elements, such as ATM switches.

FIG. 2 illustrates exemplary communication protocol layers that are implemented on interconnection point Iu between core network 104 and a radio network controller 102, as illustrated in FIG. 1. In the illustrated example, three different types of messages are communicated between the core network and the RNC over the connection point Iu. One type of message is represented protocol stack 200. Protocol stack 200 is used to carry radio access network application part (RANAP) messages between the core network and the RNC. RANAP messages are radio network signaling messages. The next layer in protocol stack 200 is the signaling connection control part (SCCP) layer. This layer performs SS7 functions, such as global title translation. The next layer is message transfer part layer 3 broadband (MTP3B), which carries large payloads (4091 bytes versus 272 bytes for normal MTP3) of SS7 traffic. The next three layers, the service specific coordination function network to network interface (SSCF-NNI) layer, the service specific connection oriented protocol (SSCOP) layer, and the ATM adaptation layer 5 (AAL5), are related to the ATM protocol. The AAL5 layer supports connection-oriented variable bit rate data services. The SSCOP layer provides TCP-like services, such as flow control, timeouts, and retransmissions for ATM networks. The purpose of the SSCF-NNI layer is to enhance the service of SSCOP to meet the needs of the NNI level 3 protocol. In addition, the SCCF at the NNI provides communication with layer management for the proper operation of signaling links. Finally, the network layer, just above the physical layer is the ATM layer, which provides for the establishment of virtual circuits and transmission of ATM cells between endpoints.

Protocol stack 202 carries call setup messages for radio access networks. For example, Q.2630.1 messages are used for ATM bearer connection establishment and the binding of an ATM bearer connection or channel to a telephony connection. As used herein, Q.2630.1 refers to functionality described in International Telecommunication Union Telecommunication Standardization Sector (ITU-T) Recommendation Q.2630.1, Sep. 29, 1999, the disclosure of which is incorporated herein by referenced in its entirety. The Q.2510.1 layer provides AAL type 2 signaling transport converter service for broadband MTP. As used herein, the Q.2510.1 layer refers to functions described in ITU-T Recommendation Q.2510.1, Jun. 23, 1999, the disclosure of which is incorporated in herein in its entirety. The remaining layers in protocol stack 202 are ATM layers that perform the same or similar functions to the correspondingly-named layers of protocol stack 200.

Protocol stack 204 carries user data, such as digitized voice, between the RNC and the core network. As such, protocol stack 204 includes a user part layer that contains the actual user data, an AAL2 layer, which supports connection-oriented services that do not require constant bit rates, such as variable bit rate video applications.

Providing the multiple protocol layers illustrated in FIG. 2 in core network elements, such as ATM switches, increases the complexity and cost of these elements. Accordingly, there exists a long-felt need for methods and systems for communicating between the core network and radio network controllers that reduces the complexity of core network elements.

DISCLOSURE OF THE INVENTION

According to one aspect, the present invention includes methods and systems for communicating between a radio network controller and a core network that reduce the complexity of core network devices. The invention includes a gateway that translates between conventional core network protocols such as MTP3B, SSCF-NNI, SSCOP, AAL5, and ATM and a universal protocol, such as SS7 SCCP-User Adaptation Layer (SUA) over stream control transmission protocol/Internet protocol (SCTP/IP). The SS7 SCCP User Adaptation Layer is described in IETF internet draft <draft-loughney-sigtran-sua-00.txt, March, 2000, the disclosure of which is incorporated herein by reference in its entirety. The stream control transmission protocol is described in detail in RFC 2960, Stream Control Transmission Protocol, October 2000, the disclosure of which is incorporated herein by reference in its entirety. Providing a gateway that performs these translations reduces core network element complexity because core network elements can implement a single protocol stack for which hardware and software are readily available and inexpensive, such as SUA over SCTP/IP or TCP/IP, when communicating with radio network controllers.

As used herein, the phrase "core network" refers to the network used to carry signaling and bearer traffic to and from radio network subsystems (RNSs). Such a network has conventionally included only ATM and SS7 network elements. Because of the gateway of the present invention, such a network can include elements that communicate using a universal transport protocol, such as SCTP/IP or TCP/IP. In addition, because the gateway of the present invention translates between conventional core network protocols used by RNCs and a universal transport protocol, no modification to RNC nodes is required.

The term "radio network subsystem" refers to the collection of network elements that allow user equipment, such as mobile handsets, to access the universal mobile telecommunication system terrestrial radio access network (UTRAN). An RNS may include one or more radio network controllers (RNCs), which control the integrity and use of radio resources. An example of a commercially available radio network controller (RNC) is a switch manufactured by NEC Corporation that is based on the NEAX61 ATM switch. The UTRAN refers to the network that controls user access to the core network.

Definitions and examples of the terms used herein can be found in 3rd Generation Partnership Project; Technical Specification Group Radio Access Network; UTRAN Overall Description (3G TS 25.401 version 3.1.0 Release 1999), the disclosure of which is incorporated herein by reference in its entirety.

BRIEF DESCRIPTION OF THE DRAWINGS

A description of preferred embodiments of the invention will now proceed with reference to the accompanying drawings, of which.

DETAILED DESCRIPTION OF THE INVENTION

Figure 1:
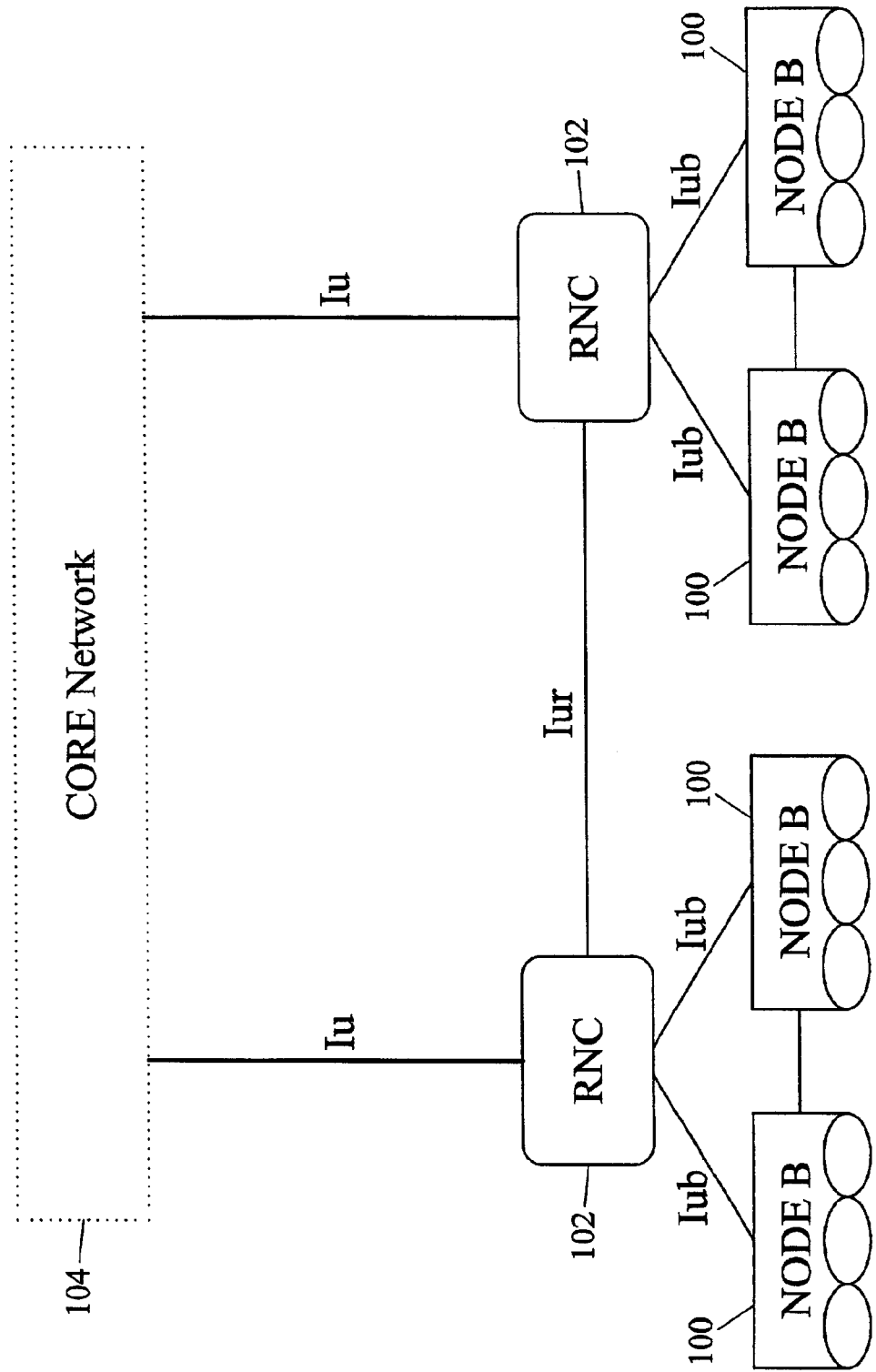
FIG. 1 is a block diagram of a conventional UTRAN architecture.
Figure 2:
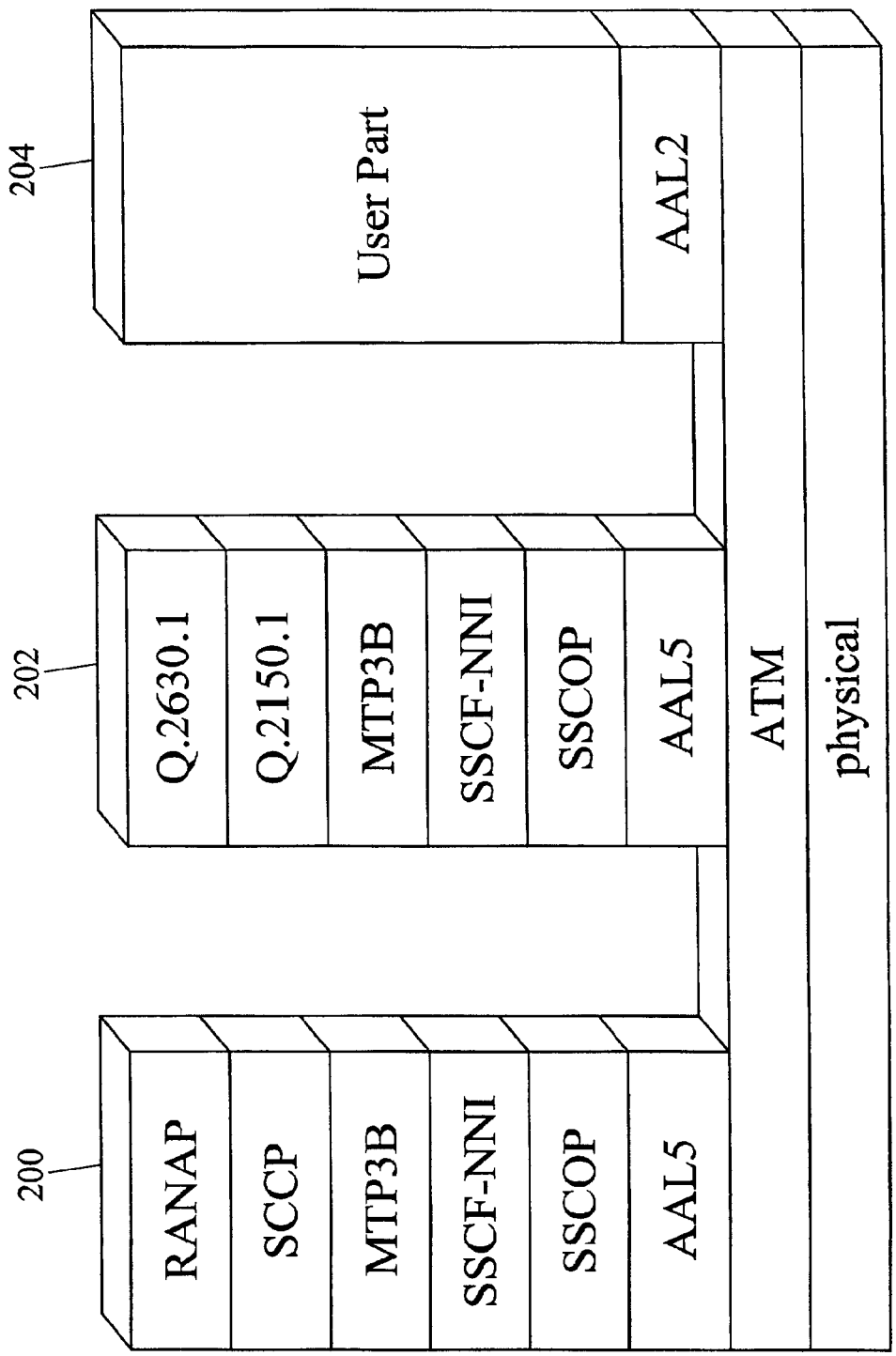
FIG. 2 is a protocol layering diagram illustrating protocols conventionally used to communicate between the core network and a radio network controller.
Figure 3:
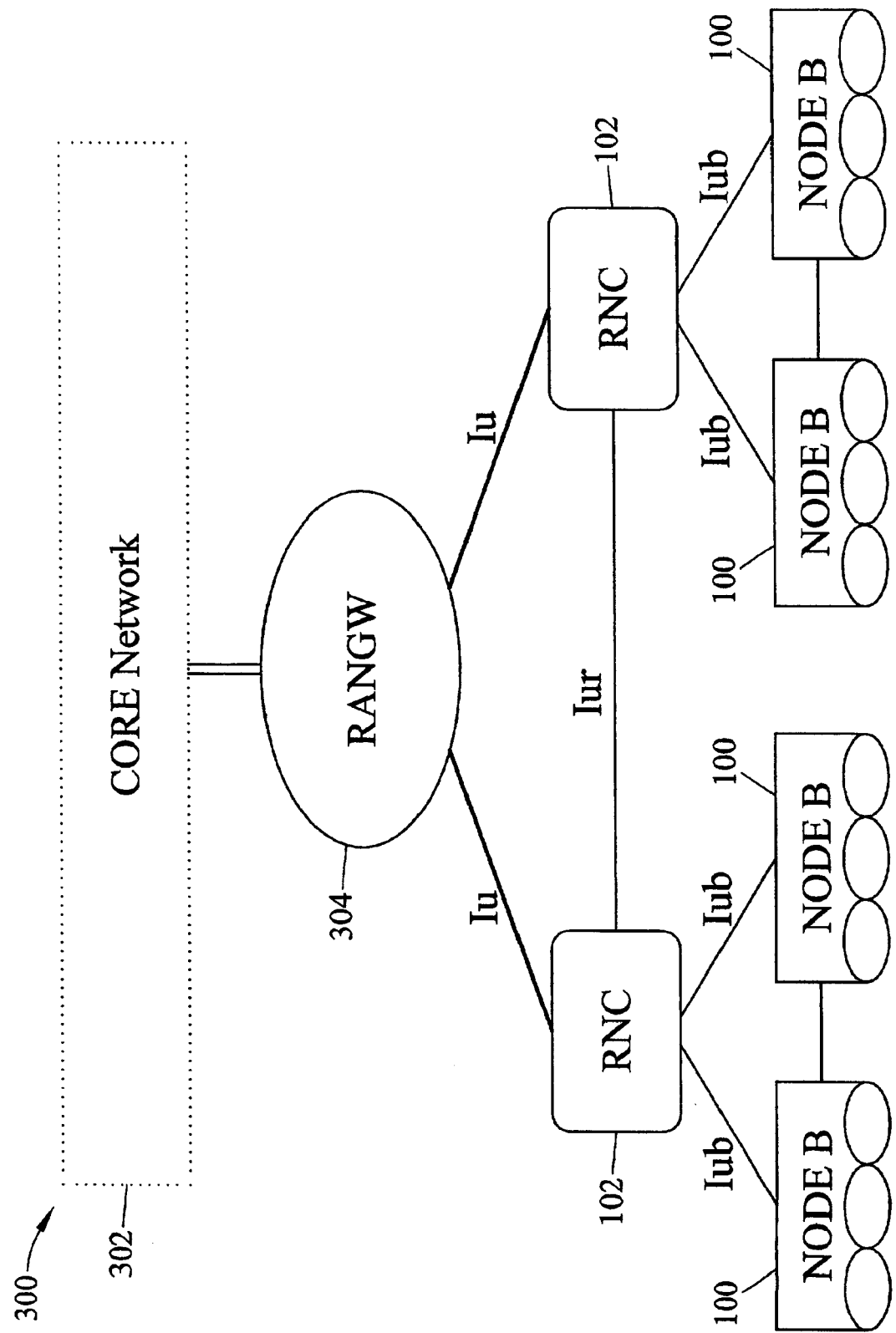
FIG. 3 is a block diagram of a radio access network including a radio access network gateway according to an embodiment of the present invention.

FIG. 3 illustrates a radio access network (RAN) including a RAN gateway according to an embodiment of the present invention. In the illustrated embodiment, radio access network 300 includes a core network 302, one or more radio network controllers 102, and a plurality of node Bs 100. Core network 302 includes network elements for communicating signaling and bearer traffic to and from RNCs 102. Such network elements have conventionally been SS7 and ATM-based network elements. However, as will be explained in more detail below, RAN gateway 304 provides functionality that allows core network 302 to implement a universal protocol, such as SCTP/IP or TCP/IP. RNCs 102 control access to radio resources of core network 302. Node Bs 100 are logical nodes responsible for radio transmission and reception in one or more cells to and from user equipment, such as mobile handsets. On the RNC side, each node B terminates the interface lub with the RNC.

A proposed standard for the lu interface between the core network and an RNC is found in $3^{rd}$ Generation Partnership Project; Technical Specification Group Radio Access Network; UTRAN lu Interface: General Aspects and Principles, Release 1999, the disclosure of which is incorporated herein by reference in its entirety. In this document, the interface used to carry signaling messages between the core network and the RNC is referred to as the control plane. There are circuit and packet switched interface proposed for the control plain. Both the circuit and packet switched interfaces rely on ATM as the underlying transport layer for carrying signaling messages to and from the core network.

RAN gateway (RANGW) 304 receives ATM-based RAN signaling messages that include an application part from a RAN network controller (RNC) node. RAN gateway 304 encapsulates the application part component of the RAN messages within an SS7 SCCP User Adaptation (SUA) or SS7 MTP3 User Adaptation (M3UA) wrapper. SS7 SCCP User Adaptation Layer is described in the above-referenced IETF Internet Draft. The SS7 MTP3 User Adaptation Layer is described in IETF Internet Draft <draft-ietf-sigtran-m3ua-04.txt>, March 2000, the disclosure of which is incorporated herein by reference in its entirety.

RAN gateway 304 also strips the lower level ATM-based protocol information from messages received from RNCs 306 and replaces this lower level protocol content with a universal protocol, such as SCTP/IP or TCP/IP. The RNC side of RAN gateway 304 may include a high speed ATM link module for communicating ATM-encapsulated messages to and from RNCs 102. The core network side of RAN gateway 304 may include a RAN data communication module (rDCM) for communicating RANAP and other messages to and from core network 302 using SCTP/IP, TCP/IP, or other universal message format. The main function of RAN gateway 304 is to reduce the need for ATM, SSCF, SSCOP and MTP3 functionality in core network 302. Removing these layers from core network 302 into a single highly reliable point outside of core network 302 greatly simplifies core network elements. For example, rather than using ATM switches to communicate messages to and from RNCs 102, core network 302 can include machines running IP-protocols, which are much less expensive than ATM switches.

Figure 4:
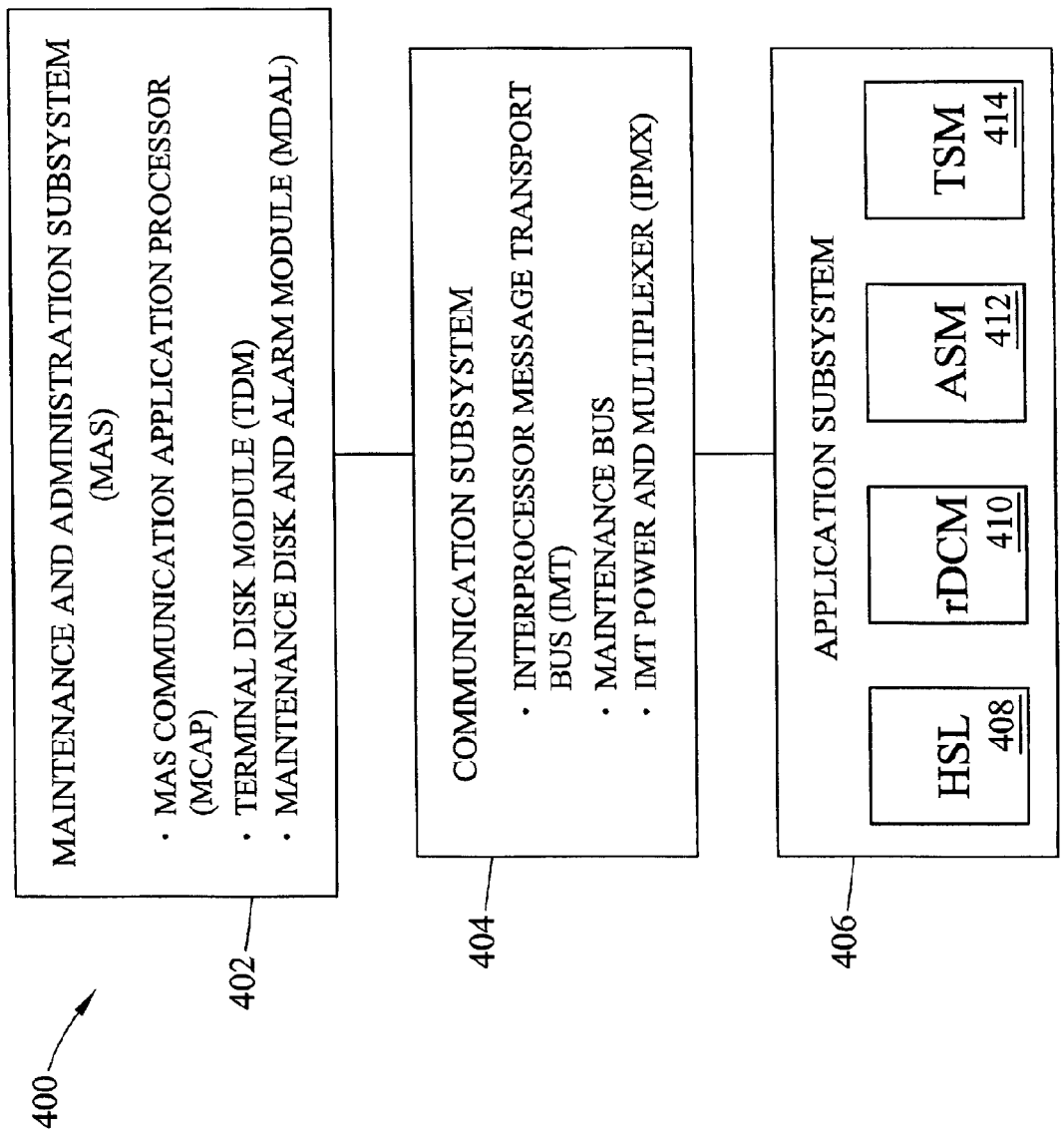
FIG. 4 is a block diagram of an exemplary signaling gateway architecture for implementing a radio access network gateway according to an embodiment of the present invention.

Disclosed herein are several embodiments of the present invention, all of which include a network element that performs functions similar to that of a traditional telecommunications network packet routing switch, such as a signaling gateway (SG) routing node. Each of the embodiments described and discussed below, employs an internal architecture similar to that of high performance signal transfer point (STP) and SG products which are marketed by Tekelec of Calabasas, Calif. as the Eagle® STP and IP[7] Secure Gateway™, respectively. A block diagram that generally illustrates the base internal architecture of the IP[7] Secure Gateway™ product is shown in FIG. 4. A detailed description of the IP[7] Secure Gateway™ may be found in Tekelec publication PN/909-0767-01, Rev B, August 1999, entitled Feature Notice IP[7] Secure Gateway™ Release 1.0, the disclosure of which is incorporated herein by reference in its entirety. Similarly, a detailed description of the Eagle® STP may be found in the Eagle® Feature Guide PN/910-1225-01, Rev. B, January 1998, published by Tekelec, the disclosure of which is incorporated herein by reference in its entirety. The specific functional components of an IP[7] Secure Gateway™ for transmitting and receiving transaction capabilities application part (TCAP) messages over an Internet protocol (IP) network are described in commonly-assigned, co-pending international publication number WO 00/35155, the disclosure of which is incorporated herein by reference in its entirety. Similarly, the functional components of an IP[7] Secure Gateway™ for transmitting and receiving ISDN user part (ISUP) messages over an Internet Protocol (IP) network are described in commonly-assigned, co-pending international publication number WO 00/35156, the disclosure of which is also incorporated herein by reference in its entirety. As described in the above referenced Feature Notice IP[7] Secure Gateway™ and as illustrated in FIG. 4, an IP[7] Secure Gateway™ 400 includes the following subsystems: a maintenance and administration subsystem (MAS) 402, a communication subsystem 404 and an application subsystem 406. MAS subsystem 402 provides maintenance communications, initial program load, peripheral services, alarm processing and system disks. Communication subsystem 404 includes an interprocessor message transport (IMT) bus that is the main communication bus among all subsystems in IP[7] Secure Gateway™ 400. This high-speed communications system includes two 125 Mbps counter-rotating serial buses.

Application subsystem 406 includes application cards that are capable of communicating with the other cards through the IMT buses. Numerous types of application cards can be incorporated into IP7 secure gateway 400, including, but not limited to: an ATM-based high speed link interface module (HSL) 408 that provides SS7 links and X.25 links, a RAN data communication module (rDCM) 410 that provides an Internet Protocol (IP) interface, and an application service module 412 (ASM) that provides global title translation, gateway screening and other services. A translation service module (TSM) 414 may also be provided to support triggered local number portability service. rDCM card 410 is a novel element of the present invention and is not describe any of the above-referenced publications regarding the IP7 secure gateway.

Additional modules that may be included in IP7 secure gateway 400 include SS7 link interface module (LIM) cards for sending and receiving SS7 messages over SS7 signaling links and data communication module (DCM) cards for sending and receiving IP encapsulated SS7 messages over an IP network, as described in the above referenced Feature Notice IP[7] Secure Gateway™ Release 1.0 publication.

Figure 5:
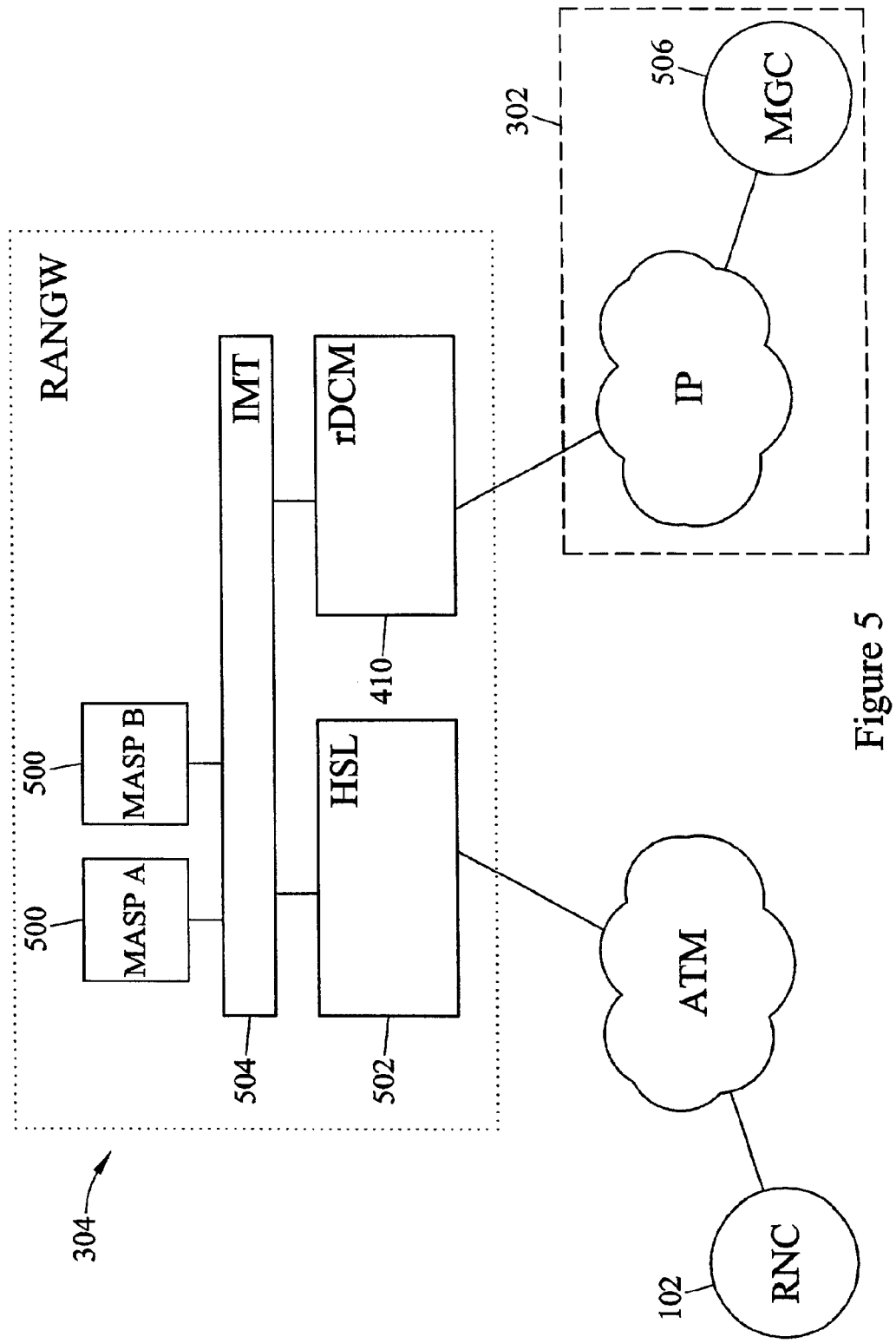
FIG. 5 is a block diagram of the internal structure of a RAN gateway according to an embodiment of the present invention.

FIG. 5 is a block diagram illustrating the internal architecture of RAN gateway 304 and the simplification of core network 302 according to an embodiment of the present invention. In the illustrated embodiment, RAN gateway includes MASP processors 500 for performing maintenance and administration functions, high speed link card 502 for sending and receiving messages over a high-speed ATM link, rDCM card 410 for translating between ATM and the core network protocol, and IMT bus 504 for providing communication between modules 500, 410, 500, and 502. RAN gateway 304 is connected to RNC 102 via an ATM network. Consequently, signaling messages received at by HSL module 502 within RAN gateway 304 will include a lower level ATM protocol component. RAN gateway 304 is also connected via an IP-based (e.g., SCTP/IP, TCP/IP, UDP/IP, etc.) communication link to a media gateway controller (MGC) 506 in core network 302.

Each of the modules 410, 500, and 502 include hardware and software components for performing the functions described herein. For example, each of the modules 410, 500, and 502 may include a printed circuit board with one or more microprocessors mounted thereon. In a preferred embodiment, each of the modules 410, 500, and 502 includes an application processor and a communication processor. The application processor of each module performs module-specific functions. For example, the application processor of rDCM 410 may perform SCTP/IP encapsulation of messages received from HSL module 502. The communication processor of each module is responsible for sending and receiving messages via IMT bus 504.

In operation, an ATM-based RAN signaling message sent by RNC 102 is received by HSL module 502 of RAN gateway 304. In one embodiment, HSL module 502 may remove the lower level ATM protocol component of the message, and internally route the message to rDCM communication module 410. HSL module 502 internally routes SS7 messages by examining the destination point code (DPC) in the message and converting the DPC into an internal card address.

rDCM module 410 may encapsulate some or all of an application part component of the message into a SUA, M3UA, TALI or equivalent wrapper. The TALI protocol is described in IETF Internet Draft <draft-benedyk-sigtran-tali-01.txt>, June 2000, the disclosure of which is incorporated herein by reference in its entirety. An SCTP/IP, TCP/IP, UDP/IP or equivalent IP-based protocol layer is then appended to the encapsulated message prior to transmission from rDCM 410. The encapsulated IP message is then delivered via IP-based core network 302 to MGC node 506.

Because RAN gateway translates incoming ATM messages to IP-based messages, core network 302 is greatly simplified. For example, core network 302 can include conventional IP-based elements, such as media gateway controllers, rather than ATM switches. In addition, because RAN gateway 304 includes ATM communication capabilities, modification to RNC nodes is not required.

Figure 6:
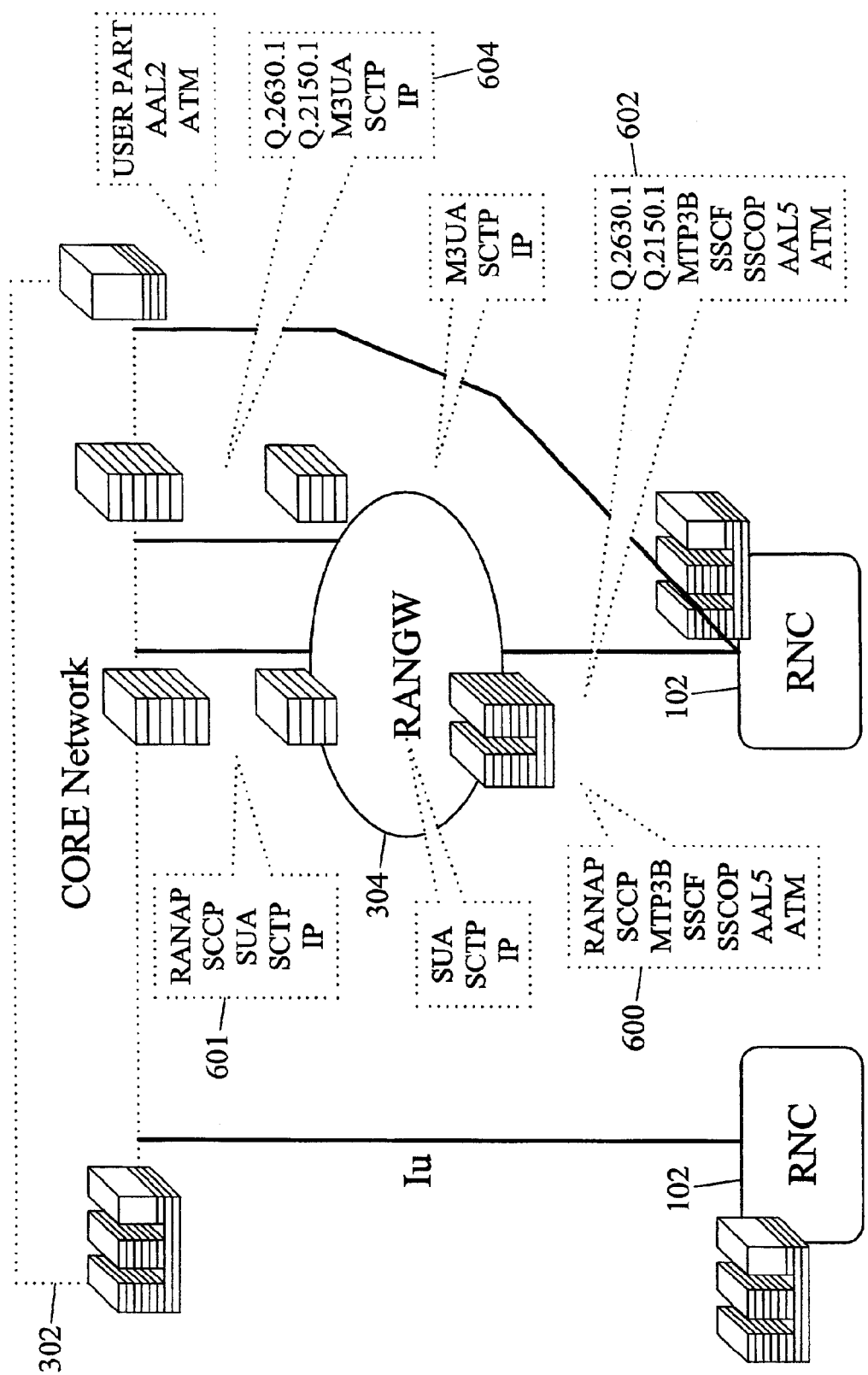
FIG. 6 is as block diagram of a radio access network illustrating exemplary messages processed and formulated by a RAN gateway according to an embodiment of the present invention.

FIG. 6 is a network diagram illustrating two types of RAN signaling messages that may be encountered in a RAN network and consequently handled by a RAN gateway of the present invention. One type of RAN signaling message 600 contains a RAN application part (RANAP) component, a signaling connection control part (SCCP) component, a message transfer part level 3 broadband (MTP3B) component, and lower-level ATM-based components. Accordingly, RAN gateway 304 may be adapted to receive an ATM-based RAN message that contains such an application part structure, and subsequently encapsulate the application part components within an SUA wrapper. An SCTP/IP lower level is then appended to the SUA encapsulated RAN message, which is subsequently routed via IP-based core network 302 to a destination node. The resulting message is indicated by reference numeral 601 in FIG. 6.

With regard to the SCCP component, RAN gateway 304 may or may not include this component in messages sent to IP-based core network 302. For example, RAN gateway 304 may receive messages including RANAP, SCCP, MTP3B, and ATM components. In one embodiment, RAN gateway 304 may encapsulate the SCCP component in an SUA layer and send the SUA-encapsulated message to core network 302. In such an embodiment, the message send to core network 302 may include RANAP, SCCP, SUA, SCTP, and IP components. In an alternative embodiment, RAN gateway 304 may remove the SCCP layer from the message and replace the SCCP layer with an SUA layer. In such and embodiment the message sent to core network 302 may include RANAP, SUA, SCTP, and IP components. Either alternative is intended to be within the scope of the invention.

Another type of signaling message that may be encountered by RAN gateway 304 on the RNC side includes Q.2630.1 and Q.2150.1 application-level components lower-level SS7 and ATM-based components. Such a message is generally indicated by reference numeral 602. RAN gateway 304 preferably removes the Q.2630.1 and Q.2150.1 layers and encapsulates these layers in an M3UA wrapper. RAN gateway 304 may then add an SCTP/IP lower-level component to form the message indicated by reference numeral 604.

In addition to translating messages from the RNC side to the core network side, RAN gateway 304 may also translate messages received from the core network to a format recognizable by RNCs. For example, in FIG. 6, RAN gateway 304 may receive a message 601 having a RANAP component, an SCCP component, an SUA component, and an SCTP/IP component. RAN gateway 304 may remove the upper-level RANAP and SCCP components, discard the lower-level SCTP/IP components, and add ATM components to form an ATM-based RANAP message 600. Similarly, RAN gateway 304 may also receive messages from core network 302, such as message 604, that includes upper-level Q.2630.1 and Q.2150.1 components and lower-level SCTP/IP components. In response to these messages, RAN gateway 304 may formulate a message with lower-level ATM components, as illustrated by reference numeral 602. Thus, RAN gateway 304 is capable of translating messages received from the core network into a format recognizable by a radio network controller and vice versa.

Detailed Description of Processing of Ranap Messages

Figure 7:
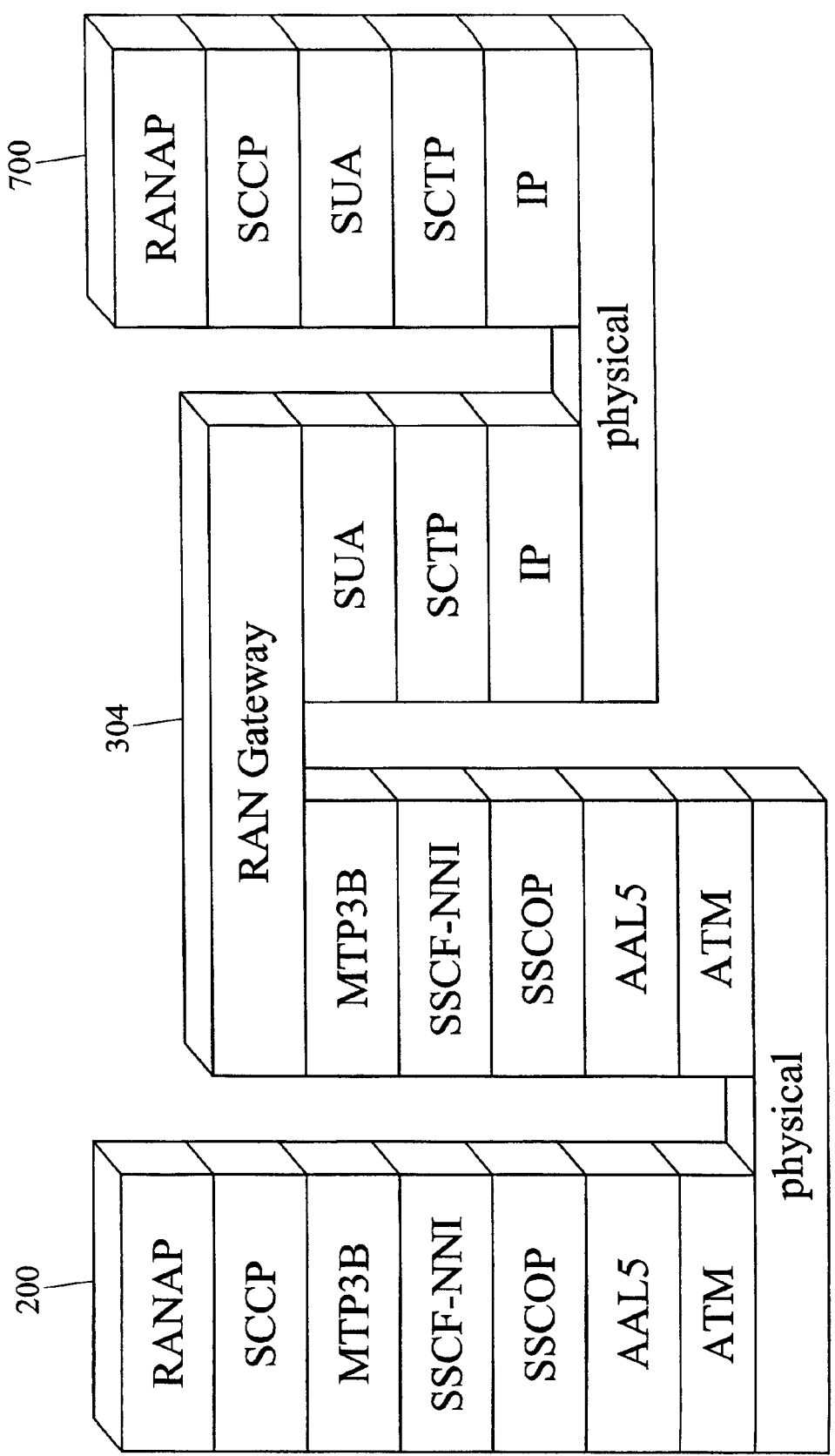
FIG. 7 is a protocol layering diagram illustrating exemplary functions performed by a RAN gateway in translating RANAP messages to and from a universal message format according to an embodiment of the present invention.

FIG. 7 illustrates in detail the encapsulation and lower level protocol substitution functions for RANAP messages performed by RAN gateway 308 for RANAP messages. In FIG. 7, protocol stack 200 represents the structure of a RANAP message received by RAN gateway 304 from an ATM-based radio network controller. Such a message includes a RANAP component, an SCCP component, an MTP3B component, an SSCF-NNI component, an SSCOP component, and an ATM component. RAN gateway 304 removes the RANAP and SCCP components from the message and encapsulates these components in an SUA wrapper. The SUA-encapsulated message is then itself encapsulated in an SCTP/IP wrapper. The transformed message is illustrated by protocol stack 700. In protocol stack 700, the transformed message includes a RANAP portion, an SCCP portion, an SUA portion, an SCTP portion, and an IP portion. All ATM components of the original message are removed. Accordingly, the need for ATM functionality in the core network is reduced.

When RAN gateway 304 receives a message formatted according to protocol stack 700, RAN gateway 304 removes the RANAP and SCCP portions of the message and discards the lower-level SUA, SCTP, and IP portions. RAN gateway 304 then adds MTP3B, SSCF-NNI, SSCOP, AAL5, and ATM components to the RANAP and SCCP components. The resulting message is formatted according to protocol stack 200. This message can then be forwarded to an ATM-based RNC. Accordingly, because RAN gateway 304 is capable of formulating ATM-based RANAP messages based on SCT/IP-based RANAP messages, no modifications are required to existing radio network controller design.

Figure 8:
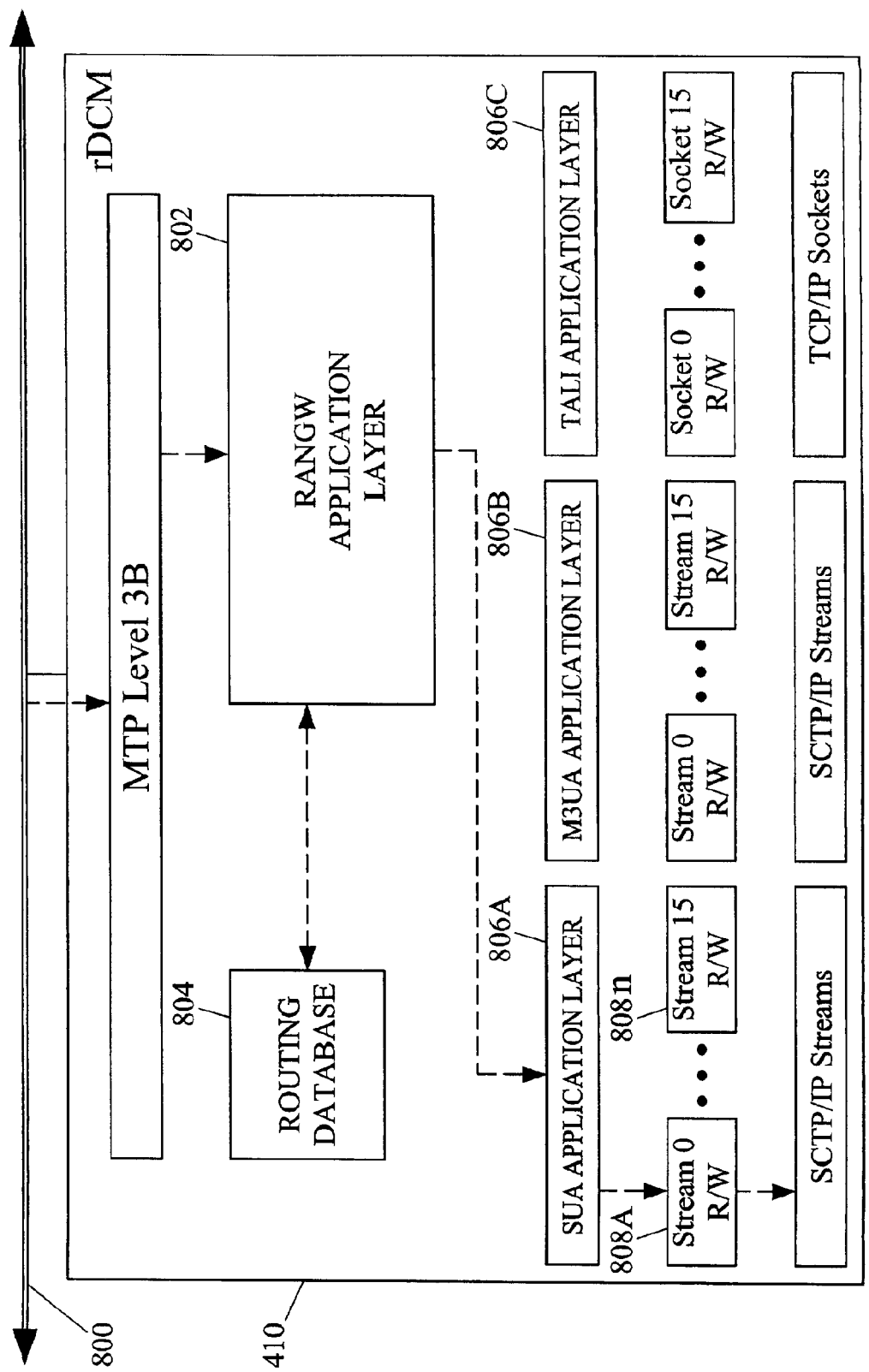
FIG. 8 is a block diagram of a radio data communications module according to an embodiment of the present invention.

FIG. 8 is a detailed block diagram of rDCM module 410 of RAN gateway 304 according to an embodiment of the present invention. rDCM 410 is adapted to receive a RAN signaling message from an HSL communication module (shown in FIG. 5) that is connected to internal IMT bus 800 of RAN gateway 304. The RAN signaling message received by rDCM 410 has had lower level ATM protocol information removed, i.e., by HSL communication module 502 illustrated in FIG. 5. The RAN signaling message is processed by a RAN gateway application layer 802 and routing instructions/information is obtained from a routing database 804 on rDCM 410.

Detailed Explanation of Ranap and Q.2630.1 Message Routing for Messages Received from the RNC Routing of a RANAP or Q.2630.1 message received from RNC 102 (illustrated in FIG. 3) may occur as follows. HSL 502 (illustrated in FIG. 5) receives the message, examines the DPC in the MTP3 part of the message and, if the message is destined for core network 104, translates the DPC to the card address of rDCM 410.

Translation of the DPC into the card address may include several intermediate steps. On HSL 502, the DPC values in incoming messages are used to determine linksets for the messages. Next, a linkset is chosen from the list of linksets available for the DPC, e.g., based on cost. Each linkset has a set of links to use for physical transmission. A link is directly associated with a card in the system, such as rDCM 410. rDCM 410 has an SCTP association and stream that can carry SUA or M3UA traffic to core network 104. Accordingly, the DPC in an incoming RANAP message may be translated as follows: DPC→linkset→link→card→SCTP association and stream.

An SCTP association is defined in the above-referenced RFC 2960 as a protocol relationship between SCTP endpoints. An association can be uniquely identified by the transport address used by endpoints in the association. A stream is defined as a uni-directional logical channel established from one to another associated endpoint through which all user messages are delivered in sequence except for those submitted to unordered delivery service.

According to the protocol, there can be only one association between SCTP endpoints. However, an endpoint is a logical entity, rather than a physical entity. rDCM 410 includes both hardware and software for communicating with core network elements. The software elements may include multiple processes for interfacing with the core network. Accordingly, rDCM 410 may have multiple SCTP associations with multiple core network elements.

Thus, an rDCM according to the present invention may establish an SCTP association with a core network element in order to communicate with an SCTP-based core network element. The steps for establishing such an association are described in the above-referenced RFC and need not be described herein. If more than one message is required to be sent for a given transaction, the messages may be sent in an ordered stream to ensure in-order delivery. Alternatively, if the only a single SCTP message is being sent, or if in-order delivery is not of concern, rDCM may send the messages using unordered SCTP delivery service. Either method of using SCTP to communicate between a RAN gateway and the core network is intended to be within the scope of the invention. As an example, an incoming RANAP or Q.2630.1 message received from RNC 102 may have a destination point code of 2-2-2. DPC 2-2-2 may be associated with linksets Chicago A and Detroit B. In this example, Chicago A may be chosen based on the cost of the linkset. The linkset Chicago A may have one link, identified as 1201, which is assigned to card 1201. Card 1201 may be rDCM 410. Accordingly, HSL 502 may send the message to rDCM 410 because rDCM 410 is located in slot 1201. rDCM 410 may then examine routing keys, such as destination point code (DPC) and service indicator (SI) in the message and match the DPC:SI with an SCTP association and send the message on the association.

Depending on the message type or information contained in the RAN signaling message, the message is passed to an appropriate encapsulation/application layer process 808A, 808B, or 808C. In the example shown in FIG. 8, the message is passed to SUA application process 808A. SUA application process encapsulates the RANAP/SCCP/MTP3B content of the message within an SUA wrapper. The SUA wrapped packet is then directed to one of the appropriate SCTP/IP streams 808A–808N for outbound transmission.

Detailed Description of Routing and Processing of Ranap Messages Received from the Core Network RAN gateway 304 terminates the ATM, AAL5, SSCOP, SSCF-NNI, and MTP3B layers. The MTP3B layers include the MTP3 header and user part. rDCM 410 receives the message, discards the MTP3B part, and uses the user part to formulate the outgoing message. The user part may include, for example, the SCCP and RANAP portions of the message. The SCCP part is decoded to create the SUA part. The user part is then wrapped in SUA. SCTP and IP are then used to send to the IP-based node, such as a core network node.

The ATM part of the message is not important because each RNC has a point code and routing is performed based on point codes. HSL card 104 may have only one ATM virtual circuit, so there is only one path to send the message to the RNC.

As stated above, for SCTP/IP messages received fom core-network 104, rDCM 410 of RAN gateway 304 may translate messages formatted according to protocol stack 700 into messages formatted according to protocol stack 200. For example, referring to FIG. 7, an incoming message from core network 104 may include a RANAP, SCCP, SUA, SCTP, and IP components. rDCM 410 of RAN gateway 304 removes the SCTP and IP layers from the message and discards these layers. Next, rDCM 410 examines destination information in the SUA layer to determine the final destination (point code) of the message. Based on the destination address in the SUA layer, the RANAP and SCCP parts of the original message are placed in an SCCP message with a new routing label. The message is then forwarded to SS7 routing. SS7 routing examines the DPC in the new routing label. The DPC is then used to determine a card address as follows: DPC→link set→ link→ card, as discussed above. The message is then forwarded to the appropriate card via IMT bus 504. If the destination is RNC 102, the destination card may be HSL 502. HSL 502 passes the message to MTP3B processing, which passes the message to MTP2 processing (ATM layer) for transmission. Thus, RAN gateway 304 is capable of converting non-ATM-formatted messages from core network 302 into an ATM format recognized by RNC 102.

Detailed Description of Processing of Q.2630.1 and Q.2150.1 Messages

Figure 9:
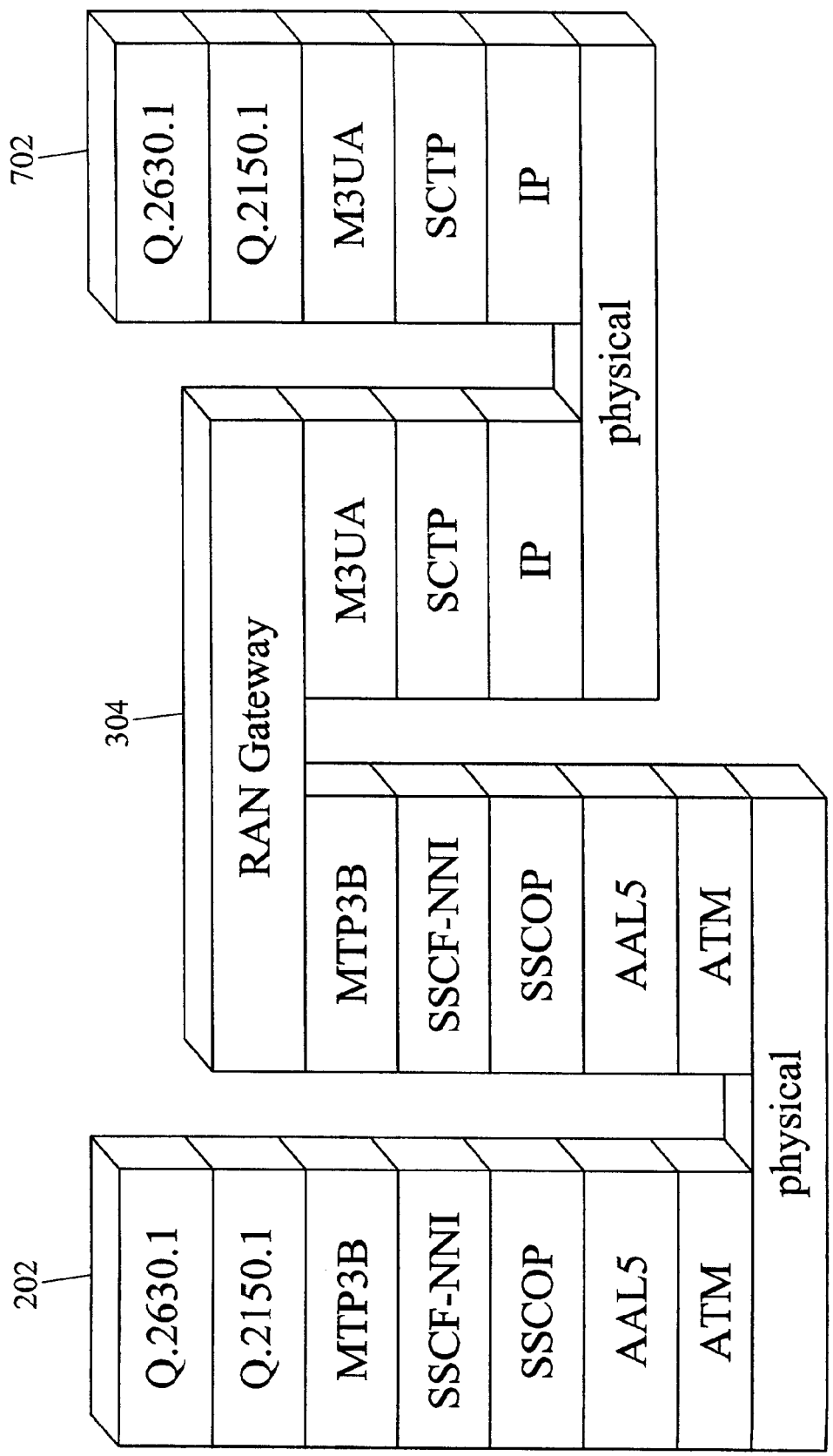
FIG. 9 is a protocol layering diagram illustrating exemplary functions performed by a RAN gateway in translating bearer access control messages to and from a universal message format according to an embodiment of the present invention.

FIG. 9 illustrates protocol stack translations performed by RAN gateway 304 for messages containing Q.2630.1 and Q.2150.1 components. Referring to FIG. 9, protocol stack 202 represents the format of messages that may be received by RAN gateway from RNC nodes in order to set up bearer connections. In the illustrated example, such messages include a Q.2630.1 layer, a 2150.1 layer, an MTP3B layer, an SSCF-NNI layer, an AAL5 layer, and an ATM layer. RAN gateway 304 uses the Q.2150.1 layer to map messages between Q.2150.1 and M3UA. Exemplary Q.2150.1 and M3UA mappings are illustrated in Table 1 below.

TABLE 1

| Q.2150.1-M3UA Mappings | |
|---|---|
| Q.2150.1 | M3UA |
| MTP PAUSE | DUNA |
| MTP RESUME | DAVA |
| MTP STATUS | SCON |
| MTP TRANSFER | DATA |

Q.2150.1 is a two-sided interface. One side interfaces to MTP3B and is mapped according to Table 1. The other side is to Q.2630.1 which is not handled by M3UA. If core network 302 does not run a Q.2150.1 protocol stack, RAN gateway 304 may map the lower (MTP3B) side of the Q.2150.1 to a specific M3UA message, if such mapping is available, as indicated in Table 1. Alternatively, RAN gateway 304, if core network 302 implements a Q.2150.1 protocol stack or if a specific mapping is not available, RAN gateway 304 may map everything from MTP3B up to an M3UA DATA message. Performing the mapping illustrated in Table 1 at RAN gateway 304 further simplifies core network elements.

A message is received by RAN gateway 304 from an RNC 102. The message may include ATM, AAL5, SSCF-NNI, MTP3B, Q.2150.1, and Q.2630.1 components. HSL 502 processes the ATM, AAL5, SSCOP, and SSCF-NNI components in a manner that is dependent on conventional HSL design. The message is then passed to the MTP3B layer, which performs a mapping from DPC to linkset to link to card address as previously described. In this example, it is assumed that the card address is the address of rDCM 410. The message is forwarded to rDCM 410 via IMT bus 504.

Once the message arrives at rDCM 410, the routing label is matched with an SCTP association and stream. At this point, rDCM 410 may examine the Q.2150.1 layer of the message and map the message type to an M3UA message type as illustrated above in Table 1. Alternatively, rDCM 410 may wrap the entire message into an M3UA DATA message without further examination of the Q.2150.1 layer. Thus, rDCM 410 may map Q.2150.1 messages to specific M3UA messages or convert all messages to Q.2150.1 data messages without examining the Q.2150.1 layer.

In addition to processing Q.2150.1 messages received on the RNC side, RAN gateway 304 is preferably also capable of processing such messages received from the core network. For example, RAN gateway 304 may receive a message from core network 302 that includes Q.2630.1, Q.2150.1, M3UA, SCTP, and IP layers. The mapping of such messages into an ATM-based format may be similar to that described above for SUA messages. For example, when such a message is received by rDCM 410, rDCM 410 examines the M3UA message type and converts the message to a standard SS7 MTP3B message using the DPC extracted from the M3UA layer. The message is then passed to SS7 routing where the message is routed as follows: DPC→linkset→link→card. In this example, it is assumed that the message is mapped to the card address for HSL card 502. Accordingly, rDCM 410 routes the message to HSL card 502 via IMT bus 504. The message is then sent over an outbound signaling link to RNC 102.

In order to map incoming SUA and M3UA messages to standard SS7 messages, rDCM 410 may examine a protocol data parameter that corresponds to the SS7 routing label. RAN gateway 304 utilizes the protocol data parameter to build the routing label. The routing label contains the standard SS7 destination point code which allows rDCM 410 to convert from DPC to card address. Thus, RAN gateway 304 is capable of converting and routing messages received from IP-based core network 302 to an RNC.

RAN Gateway with Billing System

Figure 10:
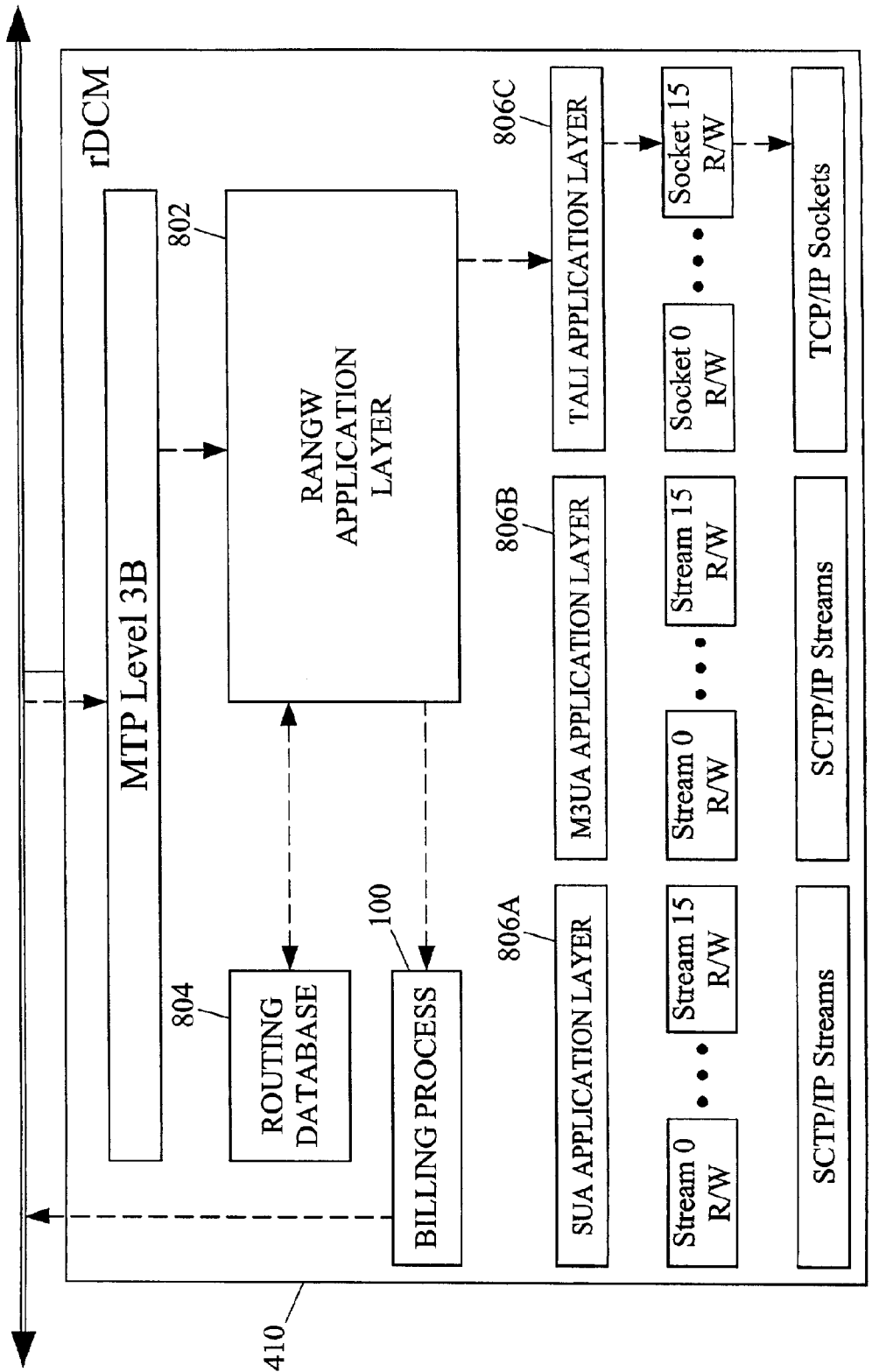
FIG. 10 is a block diagram of a radio data communications module including a billing module according to an embodiment of the present invention.
Figure 11:
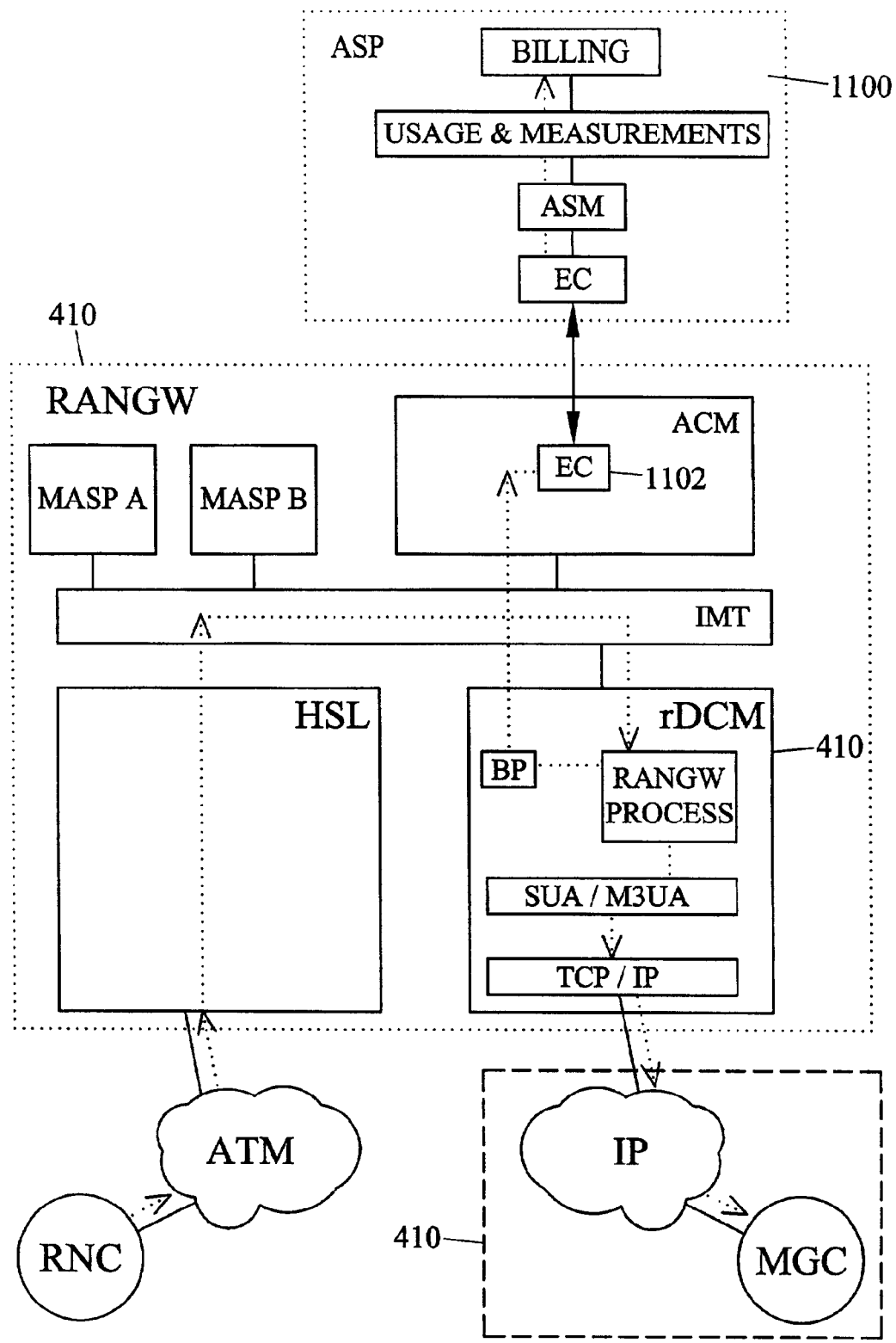
FIG. 11 is a block diagram of a RAN gateway including a billing subsystem according to an embodiment of the present invention.

FIGS. 10 and 11 illustrate embodiments of a RAN gateway that include a billing subsystem. As illustrated in FIG. 11, rDCM 410 includes a billing process 1000 that is adapted to generate a billing message in response to the receipt of a RAN signaling message that satisfies a predetermined set of billing or message accounting criteria. RAN application layer 802 is adapted to pass billing process 1000 a copy of the received RAN signaling message, and billing process 1000 determines whether a billing message needs be generated. In the event that billing message generation is required, billing process 1000 creates a billing message and routes the billing message to a message accounting and billing subsystem 1100, as indicated by the dashed line in FIG. 11. In one embodiment, message accounting and billing subsystem 1100 may reside on an external processing platform that is communicatively coupled to RAN gateway 304 via a high speed Ethernet type connection. An ACM Ethernet controller 1102 is adapted to communicate with message accounting and billing subsystem 1100 located on external processing platform via the Ethernet link, and also with rDCM module 1000 via the internal IMT bus. Billing messages are received and processed by the message accounting and billing subsystem 1100, and bills or invoices may be generated that indicate services provided, service recipients, and service providers. For example, bills or invoices may be generated for access to a database, such as an HLR, owned by a service provider. If another service providers requires access to subscriber information in the database, the first service provider may bill the second service provider for the database access. Such billing may be based on RANAP messages and performed by the components illustrated in FIGS. 10 and 11.

In addition to generating bills and invoices, message accounting and billing subsystem 1100 may store messages and provide usage and measurements data for network monitoring or maintenance purposes. Finally, the present invention is not limited to a RAN gateway having an external message accounting and billing system. In an alternative embodiment, message accounting and billing system 1100 may be implemented on or by a printed circuit board internal to RAN gateway 304.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for communicating a radio access network (RAN) signaling message between a radio network controller (RNC) and a core switching network, the method comprising:
   (a) receiving, from an RNC, a RAN signaling message that includes an asynchronous transfer mode (ATM) protocol component, an SS7 protocol component, and an application part protocol component;
   (b) encapsulating the application part protocol component of the RAN signaling message within a first protocol envelope;
   (c) replacing the ATM protocol component of the RAN signaling message with a non-ATM protocol component; and
   (d) transmitting the RAN signaling message as modified by steps (b) and (c) to a core network.

2. The method of claim 1 wherein receiving a RAN signaling message that includes an ATM protocol component includes receiving a RAN signaling message having an ATM adaptation layer 5 (AAL5) layer.

3. The method of claim 1 wherein receiving a RAN signaling message that includes an ATM protocol component includes receiving a RAN signaling message having a service specific connection oriented protocol (SSCOP) layer.

4. The method of claim 1 wherein receiving a RAN signaling message that includes an ATM protocol component includes receiving a RAN signaling message having a service specific coordination function network to network interface (SSCF-NNI) layer.

5. The method of claim 1 wherein receiving a RAN signaling message that includes an application part protocol component includes receiving a RAN signaling message having a signaling connection control part (SCCP).

6. The method of claim 1 wherein receiving a RAN signaling message that includes an application part protocol component includes receiving a RAN signaling message having a RAN application part (RANAP).

7. The method of claim 1 wherein receiving a RAN signaling message that includes an application part protocol component includes receiving a RAN signaling message having a Q.2150.1 protocol component.

8. The method of claim 1 wherein receiving a RAN signaling message that includes an application part protocol component includes receiving a RAN signaling message having a Q.2630.1 protocol component.

9. A method for communicating a radio access network (RAN) signaling message between a radio network controller (RNC) and a core switching network, the method comprising:
   (a) receiving, from an RNC, a RAN signaling message that includes an asynchronous transfer mode (ATM) protocol component and an application part protocol component, wherein receiving a RAN signaling message that includes an application part protocol component includes receiving a RAN signaling message having a Q.2150.1 protocol component;
   (b) encapsulating the application part protocol component of the RAN signaling message within a first protocol envelope;
   (c) replacing the ATM protocol component of the RAN signaling message with a non-ATM protocol component; and
   (d) transmitting the RAN signaling message to a core network, wherein the method further comprises:
   determining a Q.2150.1 message type of the RAN signaling message; and
   mapping the Q.2150.1 message type to an M3UA message type, and wherein encapsulating the application part within a first protocol envelope includes encapsulating the application part in an M3UA envelope having the M3UA message type.

10. A method for communicating a radio access network (RAN) signaling message between a radio network controller (RNC) and a core switching network, the method comprising:
(a) receiving, from an RNC, a RAN signaling message that includes an asynchronous transfer mode (ATM) protocol component and an application part protocol component, wherein receiving a RAN signaling message that includes an application part protocol component includes receiving a RAN signaling message having a Q.2150.1 protocol component;
(b) encapsulating the application part protocol component of the RAN signaling message within a first protocol envelope, wherein encapsulating the message within a first protocol envelope includes encapsulating the Q.2150.1 protocol component in an M3UA DATA message envelope without examining the Q.2150.1 protocol component;
(c) replacing the ATM protocol component of the RAN signaling message with a non-ATM protocol component; and
(d) transmitting the RAN signaling message to a core network.

11. The method of claim 1 wherein encapsulating the application part protocol component within a first protocol envelope includes encapsulating the application part protocol component within an SS7 SCCP User Adaptation (SUA) layer.

12. A method for communicating a radio access network (RAN) signaling message between a radio network controller (RNC) and a core switching network, the method comprising:
(a) receiving, from an RNC, a RAN signaling message that includes an asynchronous transfer mode (ATM) protocol component and an application part protocol component, wherein encapsulating application part protocol component within a first protocol envelope includes encapsulating the application part protocol component within an SS7 MTP3 user adaptation (M3UA) layer;
(b) encapsulating the application part protocol component of the RAN signaling message within a first protocol envelope;
(c) replacing the ATM protocol component of the RAN signaling message with a non-ATM protocol component; and
(d) transmitting the RAN signaling message to a core network.

13. A method for communicating a radio access network (RAN) signaling message between a radio network controller (RNC) and a core switching network, the method comprising:
(a) receiving, from an RNC, a RAN signaling message that includes an asynchronous transfer mode (ATM) protocol component and an application part protocol component wherein encapsulating the application part protocol component within a first protocol envelope includes encapsulating the application part protocol component in a transport adapter layer interface (TALI) protocol component;
(b) encapsulating the application part protocol component of the RAN signaling message within a first protocol envelope;
(c) replacing the ATM protocol component of the RAN signaling message with a non-ATM protocol component; and
(d) transmitting the RAN signaling message to a core network.

14. A method for communicating a radio access network (RAN) signaling message between a radio network controller (RNC) and a core switching network, the method comprising:
(a) receiving, from an RNC, a RAN signaling message that includes an asynchronous transfer mode (ATM) protocol component and an application part protocol component;
(b) encapsulating the application part protocol component of the RAN signaling message within a first protocol envelope;
(c) replacing the ATM protocol component of the RAN signaling message with a non-ATM protocol component, wherein replacing the ATM protocol component with a non-ATM protocol component includes replacing the ATM protocol component with an Internet protocol (IP) component; and
(d) transmitting the RAN signaling message to a core network.

15. The method of claim 14 wherein replacing the ATM protocol component with a non-ATM protocol component includes replacing the ATM protocol component with a transmission control protocol (TCP) component.

16. The method of claim 14 wherein replacing the ATM protocol component with a non-ATM protocol component includes replacing the ATM protocol component with a stream control transmission protocol (SCTP) component.

17. The method of claim 1 including generating a billing information record based on information contained in the received RAN signaling message.

18. A method for communicating a radio access network (RAN) signaling message between a radio network controller (RNC) and a core switching network, the method comprising:
(a) receiving, from an RNC, a RAN signaling message that includes an asynchronous transfer mode (ATM) protocol component and an application part protocol component;
(b) encapsulating the application part protocol component of the RAN signaling message within a first protocol envelope;
(c) replacing the ATM protocol component of the RAN signaling message with a non-ATM protocol component;
(d) transmitting the RAN signaling message to a core network; and
(e) generating a billing information record based on information contained in the received RAN signaling message, wherein generating a billing information record based on information contained in the received RAN signaling message includes using a mobile identification number (MIN) contained in the RAN signaling message.

19. A method for communicating a radio access network (RAN) signaling message between a radio network controller (RNC) and a core switching network, the method comprising:
(a) receiving, from an RNC, a RAN signaling message that includes an asynchronous transfer mode (ATM) protocol component and an application part protocol component;

(b) encapsulating the application part protocol component of the RAN signaling message within a first protocol envelope;

(c) replacing the ATM protocol component of the RAN signaling message with a non-ATM protocol component;

(d) transmitting the RAN signaling message to a core network; and (e) generating a billing information record based on information contained in the received RAN signaling message, wherein generating a billing information record based on information contained in the received RAN signaling message includes using a mobile subscriber uniform resource locator (URL) contained in the RAN signaling message.

20. A method for communicating a radio access network (RAN) signaling message between a radio network controller (RNC) and a core switching network, the method comprising:

(a) receiving, from an RNC, a RAN signaling message that includes an asynchronous transfer mode (ATM) protocol component and an application part protocol component;

(b) encapsulating the application part protocol component of the RAN signaling message within a first protocol envelope;

(c) replacing the ATM protocol component of the RAN signaling message with a non-ATM protocol component; and (d) transmitting the RAN signaling message to a core network; and (e) generating a billing information record based on information contained in the received RAN signaling message, wherein generating a billing information record based on information contained in the received RAN signaling message includes using a mobile subscriber email address contained in the RAN signaling message.

21. A method for communicating a radio access network (RAN) signaling message between a radio network controller (RNC) and a core switching network, the method comprising:

(a) receiving, from an RNC, a RAN signaling message that includes an asynchronous transfer mode (ATM) protocol component and an application part protocol component;

(b) encapsulating the application part protocol component of the RAN signaling message within a first protocol envelope;

(c) replacing the ATM protocol component of the RAN signaling message with a non-ATM protocol component; and (d) transmitting the RAN signaling message to a core network; and (e) generating a billing information record based on information contained in the received RAN signaling message, wherein generating a billing information record based on information contained in the received RAN signaling message includes using a service provider identifier contained in the RAN signaling message.

22. A method for routing and converting messages communicated between a stream control transmission protocol (SCTP)-based core network and a radio network controller (RNC), the method comprising:

(a) receiving a first message from an RNC including radio access network application part (RANAP), signaling connection control part (SCCP), message transfer part layer 3 broadband (MTP3B), service specific coordination function (SSCF), service specific connection oriented protocol (SSCOP), asynchronous transfer mode adaptation layer 5 (AAL5), and asynchronous transfer mode (ATM) layers;

(b) removing the SSCOP, AAL5, and ATM layers from the first message;

(c) using the MTP3B layer of the first message to determine an outbound SCTP association and stream for the first message;

(d) adding an SS7 SCCP user adaptation (SUA) layer to the RANAP and SCCP components of the first message;

(e) encapsulating the SUA, RANAP, and SCCP layers of the first message in an SCTP/IP envelope; and (f) routing the first message to the core network over the outbound SCTP association and stream.

23. The method of claim 22 comprising receiving a second message from the core network including RANAP, SCCP, SUA, and SCTP/IP layers;

(a) removing the SCTP/IP layer from the second message;

(b) examining destination information in the SUA layer of the second signaling message to determine a destination point code of the second message;

(c) based on the destination point code, formulating a routing label for the RANAP and SCCP layers of the second message; and (d) routing the second message to the RNC based on the routing label over a high-speed ATM link.

24. A method for routing and converting messages communicated between a stream control transmission protocol (SCTP)-based core network and a radio network controller (RNC), the method comprising:

(a) receiving a first message from an RNC including Q.2630.1, Q.2150.1, SS7 message transfer part layer 3 broadband (MTP3B), service specific coordination function (SSCF), service specific connection oriented protocol (SSCOP), asynchronous transfer mode adaptation layer 5 (AAL5), and asynchronous transfer mode (ATM) layers;

(b) removing the SSCOP, AAL5, and ATM layers from the first message;

(c) using the MTP3B layer to determine an outbound SCTP association and stream for the first message;

(d) mapping the Q.2150.1 layer of the first message to an M3UA layer;

(e) encapsulating the Q.2630.1, Q.2150.1, and M3UA layers of the first message in an SCTP/IP header; and (f) routing the first message to the core network over the SCTP association and stream.

25. The method of claim 24 comprising:

(a) receiving a second message from the core network including Q.2630.1, Q.2150.1, M3UA, and SCTP/IP layers;

(b) removing the SCTP/IP layer from the second message;

(c) generating a routing label for the second message based on SS7 address information contained in the M3UA layer of the second message; and (d) using the routing label to route the second message to the radio network controller over an SS7 signaling link.

26. The method of claim 24 wherein mapping the Q.2150.1 layer to an M3UA layer includes mapping every Q.2150.1 layer message received from the radio network controller to an M3UA DATA message.

27. The method of claim 24 wherein mapping a Q.2150.1 layer to an M3UA layer includes examining the Q.2150.1 layer to determine a Q.2150.1 message type and mapping the Q.2150.1 message type to an M3UA message type.

28. A method for processing radio access network application part (RANAP) messages received from a radio network controller (RNC), the method comprising:
    (a) receiving a message including RANAP, signaling connection control part (SCCP), message transfer part layer 3 broadband (MTP3B), and asynchronous transfer mode (ATM) components;
    (b) removing the ATM component from the message;
    (c) replacing the SCCP component of the message with an SS7 SCCP user adaptation (SUA) component;
    (d) using the MTP3B component of the message to select an outbound stream control transmission protocol (SCTP) association and stream for the message;
    (e) removing the MTP3B component from the message;
    (f) adding an SCTP/IP component to the message; and
    (g) transmitting the message to a core network over the SCTP association and stream.

29. A routing node for routing a radio access network (RAN) signaling message between a radio network controller (RNC) and a core switching network, the routing node comprising:
    (a) a first communication module for receiving messages from an RNC including application-level components and ATM components and for removing the ATM components from the messages; and
    (b) a second communication module for receiving the application-level components from the first communication module, encapsulating the application-level components from each of the messages in an adaptation layer, encapsulating the adaptation layer in a lower-level protocol other than ATM, and routing the encapsulated messages to a core switching network.

30. The routing node of claim 29 wherein the first communication module is an ATM link interface module.

31. The routing node of claim 29 wherein the second communication module is a radio data communication module (rDCM).

32. The routing node of claim 29 wherein the lower-level protocol includes a stream control transmission protocol (SCTP) component.

33. The routing node of claim 29 wherein the lower-level protocol includes a transmission control protocol (TCP) component.

34. The routing node of claim 29 wherein the lower-level protocol includes an Internet protocol (IP) component.

35. The routing node of claim 29 wherein the adaptation layer includes an SS7 signaling connection control part user adaptation (SUA) layer.

36. The routing node of claim 29 wherein the adaptation layer includes an SS7 message transfer part layer 3 user adaptation M3UA layer.

37. The routing node of claim 29 wherein the adaptation layer includes a transport adapter layer interface (TALI) component.

38. The routing node of claim 29 wherein the application-level components include a signaling connection control part (SCCP) component.

39. The routing node of claim 29 wherein the application-level components include a radio access network application part component.

40. The routing node of claim 29 wherein the application-level components include a Q.2630.1 component.

41. The routing node of claim 29 wherein the application-level components include a Q.2150.1 component.

42. The routing node of claim 29 wherein the second communication module is adapted to route the encapsulated message to a media gateway controller in the core network.

43. The routing node of claim 29 wherein the second communication module is adapted to route the encapsulated message to a softswitch in the core network.

44. The routing node of claim 29 including a billing subsystem for generating usage and billing information.

45. The routing node of claim 44 wherein the billing subsystem is adapted to generate bills or invoices.

46. The routing node of claim 44 wherein the billing information includes a mobile subscriber identifier.

47. The routing node of claim 44 wherein the billing information includes a service provider identifier.

48. The routing node of claim 29 wherein the second communication module is adapted to receive messages from the core network having application-level components encapsulated in the lower-level protocol, removing the application-level components, and forwarding the application-level components to the first communication module.

49. The routing node of claim 48 wherein the first communication module is adapted to receive the application-level components from the second communication module, add ATM components to the application-level components, and forward the messages having the application- and ATM components to a radio network controller.

50. A radio access network gateway comprising:
    (a) a high-speed link (HSL) module for receiving a first message including radio access network application part (RANAP), signaling connection control part (SCCP), SS7 message transfer part layer 3 broadband (MTP3B), service specific coordination function (SSCF), service specific connection oriented protocol (SSCOP), asynchronous transfer mode adaptation layer 5 (AAL5), and asynchronous transfer mode (ATM) components, removing the SSCF, SSCOP, AAL5, and ATM components from the first message, and routing the first message based on the MTP3B component; and
    (b) a radio data communications module (rDCM) for receiving the RANAP, and SCCP, and MTP3B components of the first message, determining an outgoing SCTP association and stream for the first message, then discarding the MTP3B component, adding an SS7 SCCP user adaptation (SUA) component to the first message, encapsulating the first message in a stream control transmission protocol/internet protocol SCTP/IP envelope, and routing the first message to a core network over the SCTP association and stream.

51. The radio access network gateway of claim 50 wherein the rDCM is adapted to receive a second message from the core network including RANAP, SCCP, SUA, SCTP, and IP components, wherein the rDCM removes the SCTP and IP components from the second message, determines a routing label based on address information contained in the SUA component of the second message, and routes the second message to a radio network controller (RNC) based on the routing label over a high-speed ATM link.

52. A radio access network gateway comprising:
    (a) a high-speed link (HSL) module capable of receiving a first message from a radio network controller, the first message including Q.2630.1, Q.2150.1, MTP layer 3 broadband (MTP3B), service specific coordination function (SSCF), service specific connection oriented protocol (SSCOP), asynchronous transfer mode adaptation layer 5 (AAL5), and asynchronous transfer mode (ATM) components, removing the SSCF, SSCOP, AAL5, and ATM components, and routing the first message based on the MTP3B component; and (b) a radio data communications module (rDCM) for receiving the Q.2630.1, Q.2150.1, and MTP3B components of the first message, determining a stream control transmission protocol (SCTP) association and stream for the message based on the MTP3B component and discarding the MTP3B component, adding an SS7 MTP level 3 user adaptation (M3UA) component to the first message, encapsulating the first message in an SCTP/IP envelope, and routing the first message to a core network over the SCTP association and stream.

53. The radio access network gateway of claim 52 wherein the rDCM is adapted to receive a second message from the core network including Q.2630.1, Q.2150.1, M3UA, and SCTP/IP components, wherein the rDCM discards the SCTP/IP component, determines a routing label for the second message based on the M3UA component, adds the routing label to the second message, and routes the second message to the HSL module based on the routing label, and wherein the HSL module routes the second message to a radio network controller (RNC) based on the routing label.

54. The radio access network gateway of claim 52 wherein adding an M3UA layer to the first message includes encapsulating the first message in an M3UA DATA message regardless of a Q.2150.1 message type contained in the Q.2150.1 component of the first message.

55. The radio access network gateway of claim 52 wherein adding an M3UA layer to the first message includes examining the Q.2150 component of the first message to determine a Q.2150 message type and mapping the Q.2150 message type to an M3UA message type.

56. The method of claim 1 wherein the first protocol envelope includes an MTP 3 user adaptation layer (M3UA) protocol envelope.

57. The method of claim 1 wherein the first protocol envelope includes an SCCP user adaptation layer (SUA) protocol envelope.

58. The method of claim 1 comprising encapsulating the SS7 protocol component in the first protocol envelope.

59. The method of claim 14 wherein the first protocol envelope includes an MTP 3 user adaptation layer (M3UA) protocol envelope.

60. The method of claim 14 wherein the first protocol envelope includes an SCCP user adaptation layer (SUA) protocol envelope.

61. The method of claim 18 wherein the first protocol envelope includes an MTP 3 user adaptation layer (M3UA) protocol component.

62. The method of claim 18 wherein the first protocol envelope includes an SCCP user adaptation layer (SUA) protocol envelope.

63. The method of claim 20 wherein the first protocol envelope includes an MTP 3 user adaptation layer (M3UA) protocol component.

64. The method of claim 20 wherein the first protocol envelope includes an SCCP user adaptation layer (SUA) protocol envelope.

65. The method of claim 21 wherein the first protocol envelope includes an MTP 3 user adaptation layer (M3UA) protocol component.

66. The method of claim 21 wherein the first protocol envelope includes an SCCP user adaptation layer (SUA) protocol envelope.

* * * * *